US010303159B2

(12) United States Patent
Czinger et al.

(10) Patent No.: US 10,303,159 B2
(45) Date of Patent: May 28, 2019

(54) SYSTEMS AND METHODS FOR ADDITIVE MANUFACTURING OF TRANSPORT STRUCTURES

(71) Applicant: DIVERGENT TECHNOLOGIES, INC., Los Angeles, CA (US)

(72) Inventors: Kevin Robert Czinger, Santa Monica, CA (US); Broc William TenHouten, Rancho Palos Verdes, CA (US); Richard W. Hoyle, Granada Hills, CA (US); Donald J. Christian, Fremont, CA (US); Stuart Paul Macey, Laguna Niguel, CA (US); Antonio Bernerd Martinez, El Segundo, CA (US)

(73) Assignee: Divergent Technologies, Inc., Los Angeles, CA (US)

( * ) Notice: Subject to any disclaimer, the term of this patent is extended or adjusted under 35 U.S.C. 154(b) by 48 days.

(21) Appl. No.: 15/604,624

(22) Filed: May 24, 2017

(65) Prior Publication Data

US 2017/0343984 A1 Nov. 30, 2017

Related U.S. Application Data

(60) Provisional application No. 62/340,930, filed on May 24, 2016.

(51) Int. Cl.
*G05B 19/00* (2006.01)
*B33Y 50/00* (2015.01)
(Continued)

(52) U.S. Cl.
CPC .......... *G05B 19/4099* (2013.01); *B33Y 50/00* (2014.12); *B33Y 50/02* (2014.12);
(Continued)

(58) Field of Classification Search
CPC .............................. Y02P 10/295; G06F 17/50
See application file for complete search history.

(56) References Cited

U.S. PATENT DOCUMENTS 6,493,603 B1 * 12/2002 Haeberli ................. G06T 19/00
700/118
8,630,829 B1 * 1/2014 Gaudette ............. G06F 17/5009
703/13
(Continued)

FOREIGN PATENT DOCUMENTS

CN 104881513 A 9/2015

OTHER PUBLICATIONS

Robotbike Co. Website: Article entitled "Technology," https://robotbike.co/technology/?v=7516fd43adaa, The Robot Bike Company Ltd., UK Registered Company No. 9224668, Company founded Jan. 2013, Email: info@robotbike.co.
(Continued)

Primary Examiner — Ronald D Hartman, Jr.
(74) Attorney, Agent, or Firm — Arent Fox LLP

(57) ABSTRACT

Systems and methods for additive manufacturing of vehicles are provided. An additive manufacturing apparatus can include a printer that additively manufactures structures for a vehicle, and multiple analysis components. Each analysis component can receive information based on a design model of the vehicle and analyze the information based on an analysis factor. Each analysis component analyzes the information based on a different analysis factor. An integrator can receives the analyzed information from the analysis components, update the design model based on the analyzed information, and determine whether the updated design model satisfies criteria. If the updated design model satisfies the criteria, the integrator determines printing instructions for the printer to print one or more structures of the vehicle based on the updated design model, and if the updated design model does not satisfy the criteria, the integrator sends information based on the updated design model to the analysis components.

36 Claims, 26 Drawing Sheets

(51) Int. Cl.
*G05B 19/4099* (2006.01)
*B33Y 50/02* (2015.01)
*B22F 3/105* (2006.01)

(52) U.S. Cl.
CPC ..... *B22F 3/1055* (2013.01); *B22F 2003/1057* (2013.01); *G05B 2219/49023* (2013.01); *Y02P 10/295* (2015.11)

(56) References Cited

U.S. PATENT DOCUMENTS

| | | |
|---|---|---|
| 2011/0245950 A1 | 10/2011 | Overton |
| 2014/0214370 A1* | 7/2014 | Olhofer .................. G06F 17/50 703/1 |
| 2015/0321427 A1* | 11/2015 | Gunnarsson ........... B33Y 50/00 700/98 |
| 2015/0331402 A1 | 11/2015 | Lin et al. |
| 2015/0336331 A1 | 11/2015 | Potter |
| 2016/0016229 A1 | 1/2016 | Czinger et al. |
| 2016/0120040 A1* | 4/2016 | Elmieh ................ H05K 3/4007 427/97.3 |
| 2016/0167308 A1* | 6/2016 | Glasgow ............. B29C 67/0088 700/98 |
| 2018/0197328 A1* | 7/2018 | He .......................... G06F 17/50 |

OTHER PUBLICATIONS

International Search Report and Written Opinion dated Jul. 26, 2017, regarding PCT/US2017/034348.

* cited by examiner

Engineering Optimization Solution

| Design Refinement Levels 301 | Analysis Factors 305 | | | |
|---|---|---|---|---|
| Macro (Vehicle) Level Topology Optimization | Aerodynamic | Thermal | Linear FEA/ Stiffness | NVH |
| Mid (Node) Level Topology Optimization | Environmental Impact | DFM/ Printing Time | Non-Linear FEA / Crash | Vehicle Dynamics |
| Micro (Material) Level Topology optimization | Composite Materials | Node Location | Existing Parts Bin / System Cost | Durability |
| ... | | | ... | |

FIG. 3

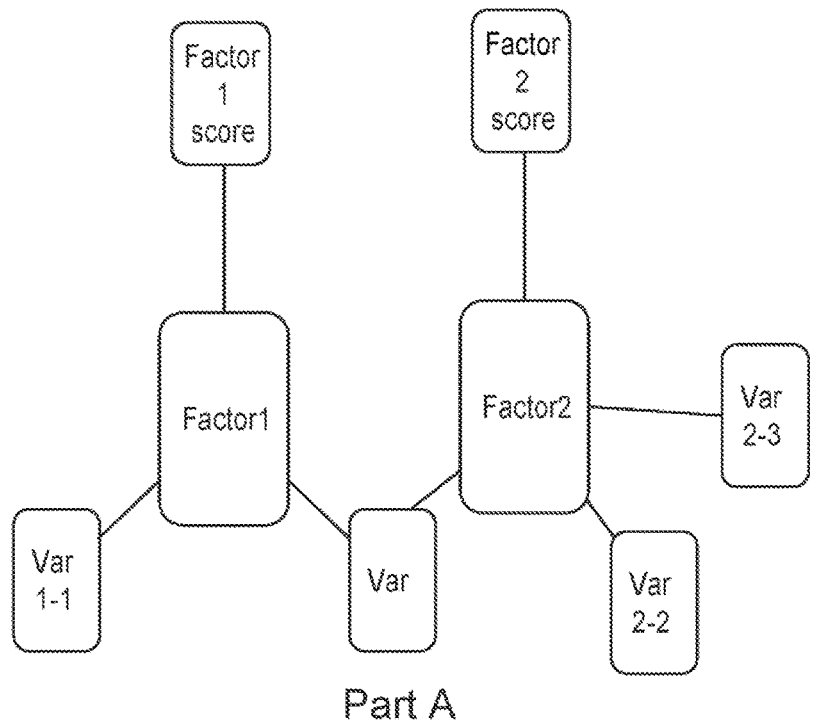
Part A
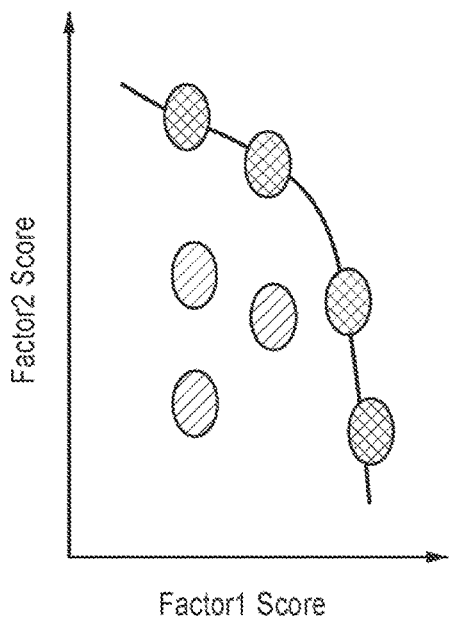
Part B
FIG. 7

Customer Selection - Detail Option Menu

| 5 | 5 | 4 | 4 | 5 |
|---|---|---|---|---|

- Overall Crash Rating
- Front crash rating
- Rear crash rating
- Left Side crash rating
- Right Side crash rating
- Rollover crash rating Customer Selection - Menu of Options

| UK | D | 5 | | EU | 2 | ZEV |
|---|---|---|---|---|---|---|

- Country of Registration
- Vehicle Class
- Crash Rating
- Ground Clearance
- Homologation
- Headlamp Class
- Emission Class

FIG. 9

SYSTEMS AND METHODS FOR ADDITIVE MANUFACTURING OF TRANSPORT STRUCTURES

CROSS-REFERENCE TO RELATED APPLICATIONS

This application claims the benefit of U.S. Provisional Patent Application No. 62/340,930, entitled SYSTEMS AND METHODS FOR ENGINEERING OPTIMIZATION FOR 3D-PRINTED STRUCTURES, and filed on May 24, 2016, which is expressly incorporated by reference herein in its entirety.

BACKGROUND

Field

The present disclosure relates generally to additive manufacturing, and more particularly, to an additive manufacturing (AM) printer for vehicle manufacture.

Background

Three-dimensional ("3-D") printed or additively manufactured structures have broad engineering applications across multiple industries, including automotive, aerospace, marine, etc. Modular construction, using nodes, or junctions is one example of construction techniques that can be used in vehicle design. This technique can result in advantages such as low tooling costs, design flexibility, and the ability to produce highly efficient structures. 3-D printed joints can be used for connection of standard structures and structural materials, such as tubes, carbon sheets, and honeycomb panels. Connection of multiple non-standard yet low cost high performance materials is also possible. For example, the joints may be printed according to the specification of geometric and physical requirements at each tube intersection point.

However, as 3-D printing designs increase in complexity, requirements or constraints (e.g., time, cost, manufacturing, etc) associated with producing 3-D printed structures also become increasingly complex. Existing topology optimization techniques may be inadequate for designing and manufacturing a 3-D printed structure based object (e.g., vehicles), taking into account complicated and sometimes conflicting design variables and objectives that differ from the conventional designs.

SUMMARY

Several aspects of additive manufacturing apparatuses for manufacturing of transport structures, such as vehicle manufacturing, will be described more fully hereinafter.

In various aspects, an additive manufacturing apparatus can include a printer that additively manufactures structures for a vehicle, a plurality of analysis components, each analysis component being configured to receive information based on a design model of the vehicle and to analyze the information based on an analysis factor, wherein each analysis component analyzes the information based on a different analysis factor than the other analysis components, and an integrator that receives the analyzed information from the analysis components, updates the design model based on the analyzed information, and determines whether the updated design model satisfies a criteria, wherein, if the updated design model satisfies the criteria, the integrator determines printing instructions for the printer to print one or more structures of the vehicle based on the updated design model, and if the updated design model does not satisfy the criteria, the integrator sends information based on the updated design model to the analysis components, and the analysis components analyze the information based on the updated design model.

In various aspects, a method of additive manufacturing can include sending information based on a design model of a vehicle to a plurality of analysis components, receiving analyzed information from the analysis components, wherein each analysis component analyzes the information based on a different analysis factor than the other analysis components, updating the design model based on the analyzed information, determining whether the updated design model satisfies a criteria, determining printing instructions for a printer to additively manufacture one or more structures of the vehicle based on the updated design model and printing the one or more structures based on the printing instructions if the updated design model satisfies the criteria, and sending information based on the updated design model to the analysis components if the updated design model does not satisfy the criteria, wherein the analysis components analyze the information based on the updated design model.

In various aspects, a non-transitory computer-readable medium storing computer-executable instructions for additive manufacturing can include instructions executable to perform sending information based on a design model of a vehicle to a plurality of analysis components, receiving analyzed information from the analysis components, wherein each analysis component analyzes the information based on a different analysis factor than the other analysis components, updating the design model based on the analyzed information, determining whether the updated design model satisfies a criteria, determining printing instructions for a printer to additively manufacture one or more structures of the vehicle based on the updated design model and printing the one or more structures based on the printing instructions if the updated design model satisfies the criteria, and sending information based on the updated design model to the analysis components if the updated design model does not satisfy the criteria, wherein the analysis components analyze the information based on the updated design model.

Other aspects will become readily apparent to those skilled in the art from the following detailed description, wherein is shown and described only several embodiments by way of illustration. As will be realized by those skilled in the art, concepts herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of additive manufacturing apparatuses for manufacturing of transport structures will now be presented in the detailed description by way of example, and not by way of limitation, in the accompanying drawings.

FIG. 3 shows exemplary components of a design optimization system.

FIG. 7 shows an example of multi-objective optimization situation and a method to solve the problem.

FIG. 9 shows examples of requirements involved in a design process.

DETAILED DESCRIPTION

Figure 1A:
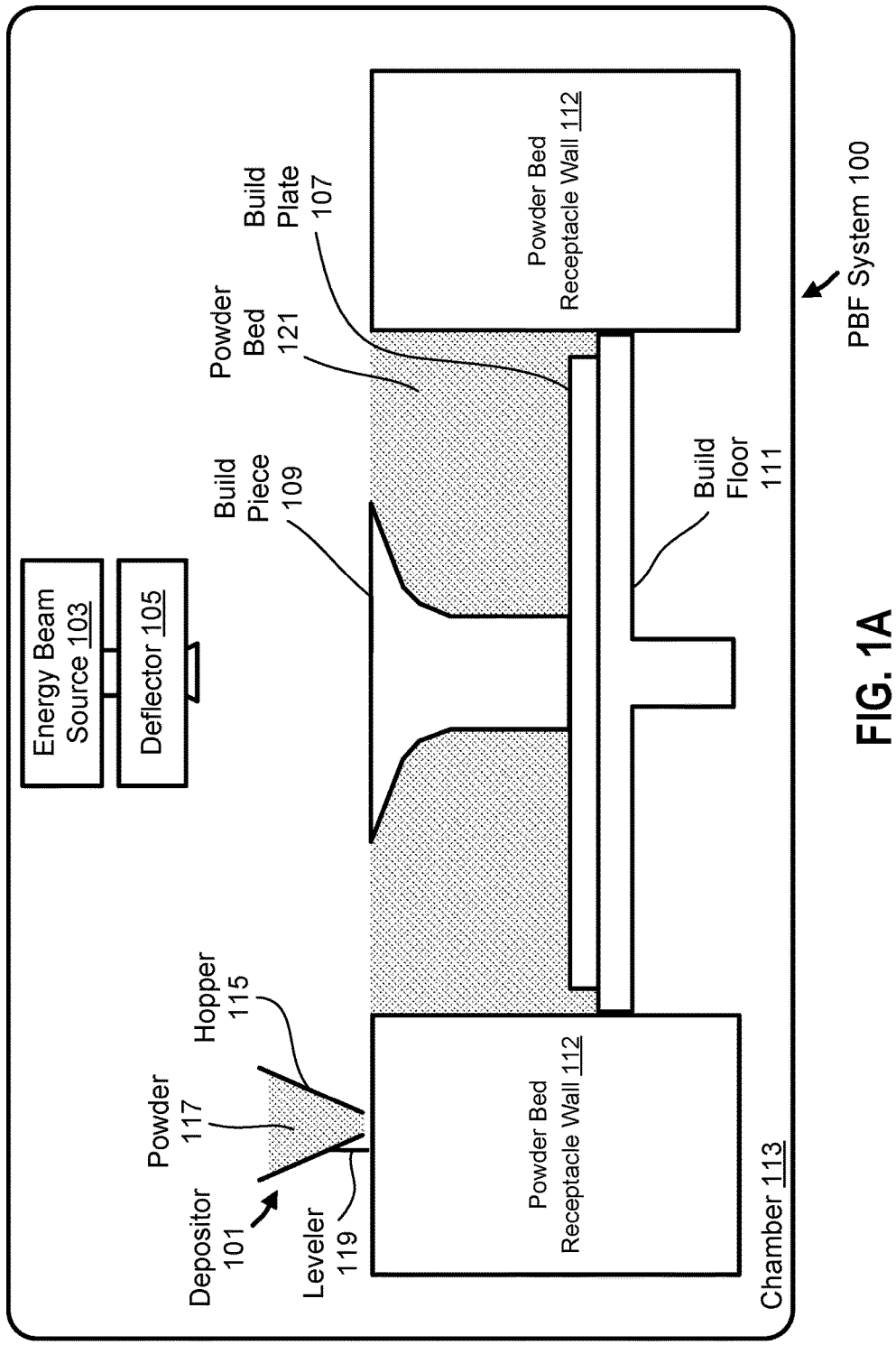
FIGS. 1A-D illustrate an example 3-D printer system during different stages of operation.

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

3-D printing technologies can allow custom aftermarket parts for cars, trucks, watercraft, aircraft, etc., to be manufactured quickly and conveniently. For example, an automobile racing team may decide, after the first race of the season, for example, that more downward force needs to be generated by the rear wing. A new rear wing that produces more downward force can be designed and printed quickly for installation before the next race of the season. In other words, 3-D printing has greatly increased the ease and ability to design and manufacture individual vehicle parts, which are typically designed to satisfy a limited number of narrowly-focused criteria (i.e., design goals) within a single analysis factor (i.e., design discipline or field). In the example above, the racing team's rear wing design focused on a single criterion, i.e., downward force, which is within the analysis factor of aerodynamics.

However, designing larger-scale vehicle assemblies, such as chassis, passenger compartments, etc., and in particular designing entire vehicles, requires many criteria to be satisfied. In these cases, a stovepipe approach is typically used, in which different factors, such as aerodynamics, durability, ergonomics, etc., are analyzed by separate teams. Each team attempts to optimize the criteria that are important to that team. For example, the crash team attempts to maximize crash test scores, while the aerodynamics team attempts to minimize coefficient of drag.

This stovepipe approach has become increasingly inefficient as criteria have become increasingly numerous and complex due to, for example, increasing government regulation, concern of environmental impact, etc. In particular, current methods for designing vehicles have not scaled well with the increasing number of criteria. Such a stovepipe approach leads to competition between teams, which can result in one team (i.e., analysis factor) dominating the design.

Various aspects of the present disclosure can, for example, provide an integrated design optimization. In various aspects, users can be provided with the latitude to customize the objects in a number of aspects.

In one aspect, the present disclosure provides a method that allows for customizing and automating a design process for 3-D printed structures. The design system may be used for 3-D structuring design. Most of the examples provided herein may refer to vehicles, however, the presented method and system can be applied broadly across industries in which 3-D printed structures form a portion of or the entire product. For instance, the 3-D printed structures can be a vehicle (e.g., sedans, trucks, buses, vans, minivans, station wagons, recreational vehicles (RVs), trailers, tractors, go-carts, automobiles, trains, motorcycles, boats, spacecraft, airplanes, etc.) that are land-based, aerial, water-based, or space-based; a part or subsystem of the vehicle, such as vehicle body, chassis, panel, engine, etc.

In various embodiments, the design objects may be based on 3-D printed nodes that are connected together with standard structural components and parts, such as tubes, sheets, arcs, honeycomb materials, etc. The nodes (e.g., joint members) may be configured to provide a connection for multiple tubes, which may be used for the construction of a lightweight space frame. A space frame can be a frame that has a three-dimensional volume. A space frame can be a frame that can accept one or more panels to at least partially enclose the frame. An example of a space frame may be a vehicle chassis. Various aspects of the disclosure may be applied to any of the applications identified here in addition to other structures including node and structure based construction. It shall be understood that different aspects of the disclosure may be utilized individually, collectively, or in combination with each other.

FIGS. 1A-D illustrate respective side views of an exemplary 3-D printer system. In this example, the 3-D printer system is a powder-bed fusion (PBF) system 100. FIGS. 1A-D show PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
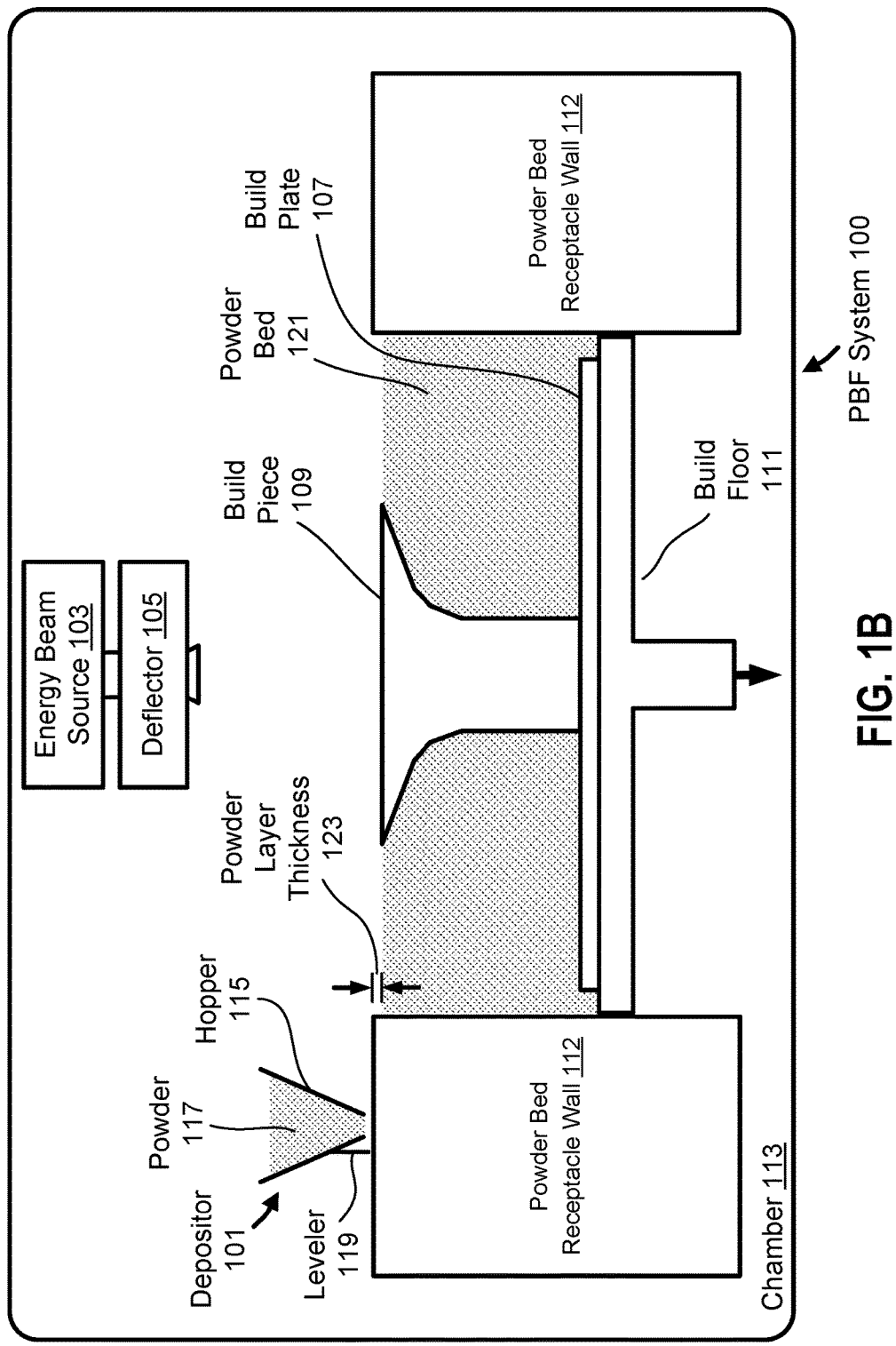

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
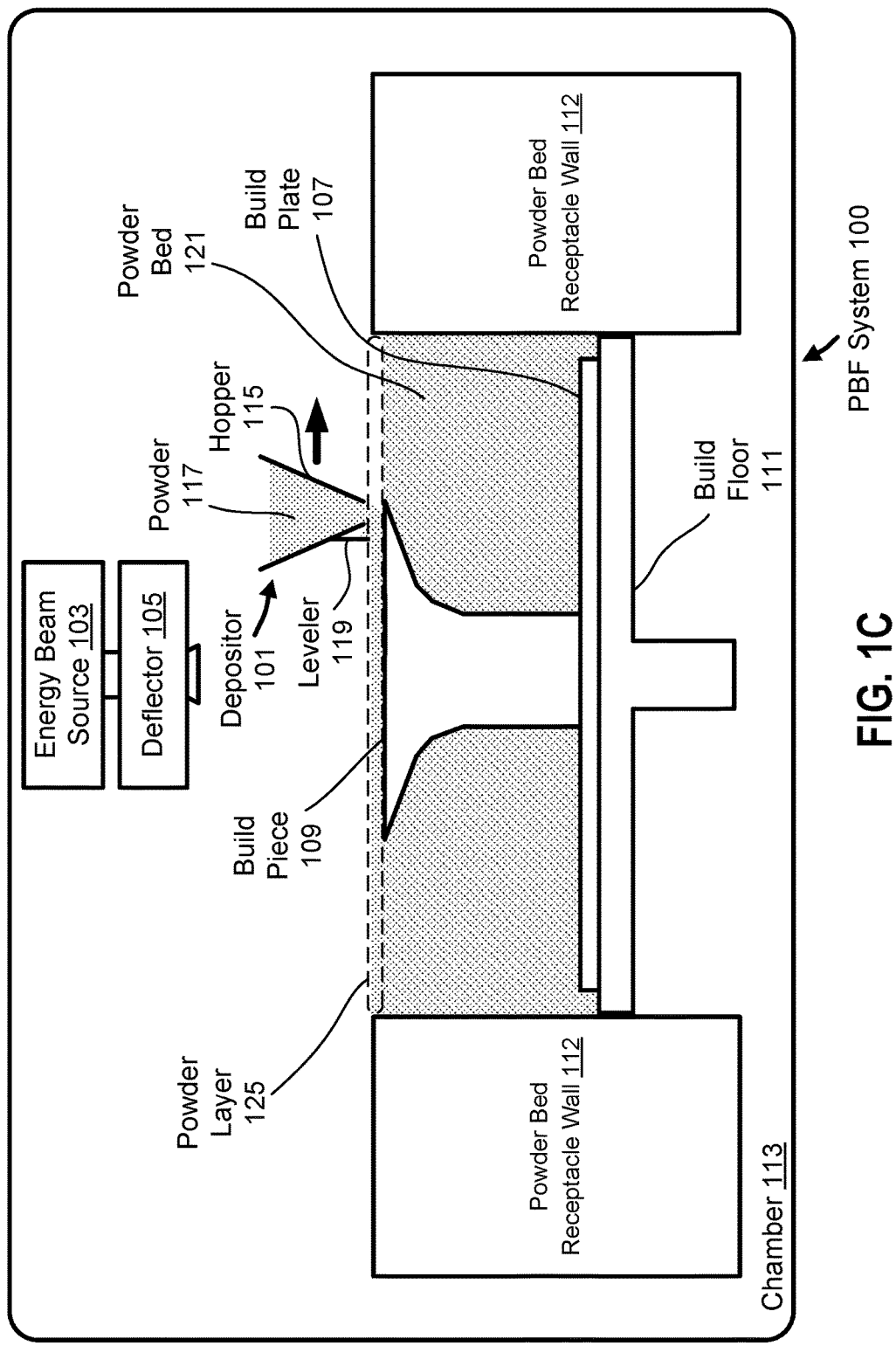

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving 150 previously-deposited layers discussed above with reference to FIG. 1A.

Figure 1D:
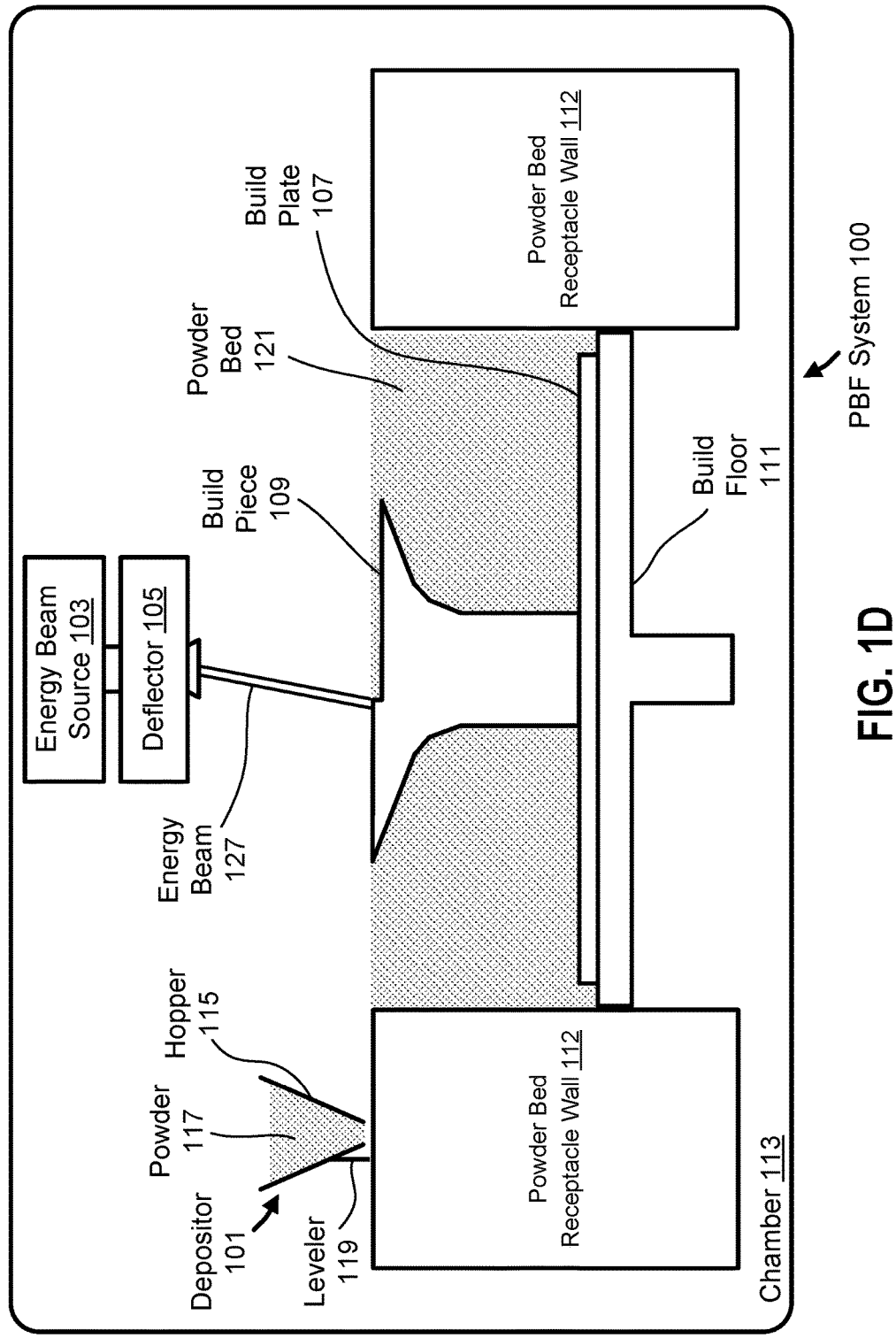

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 2:
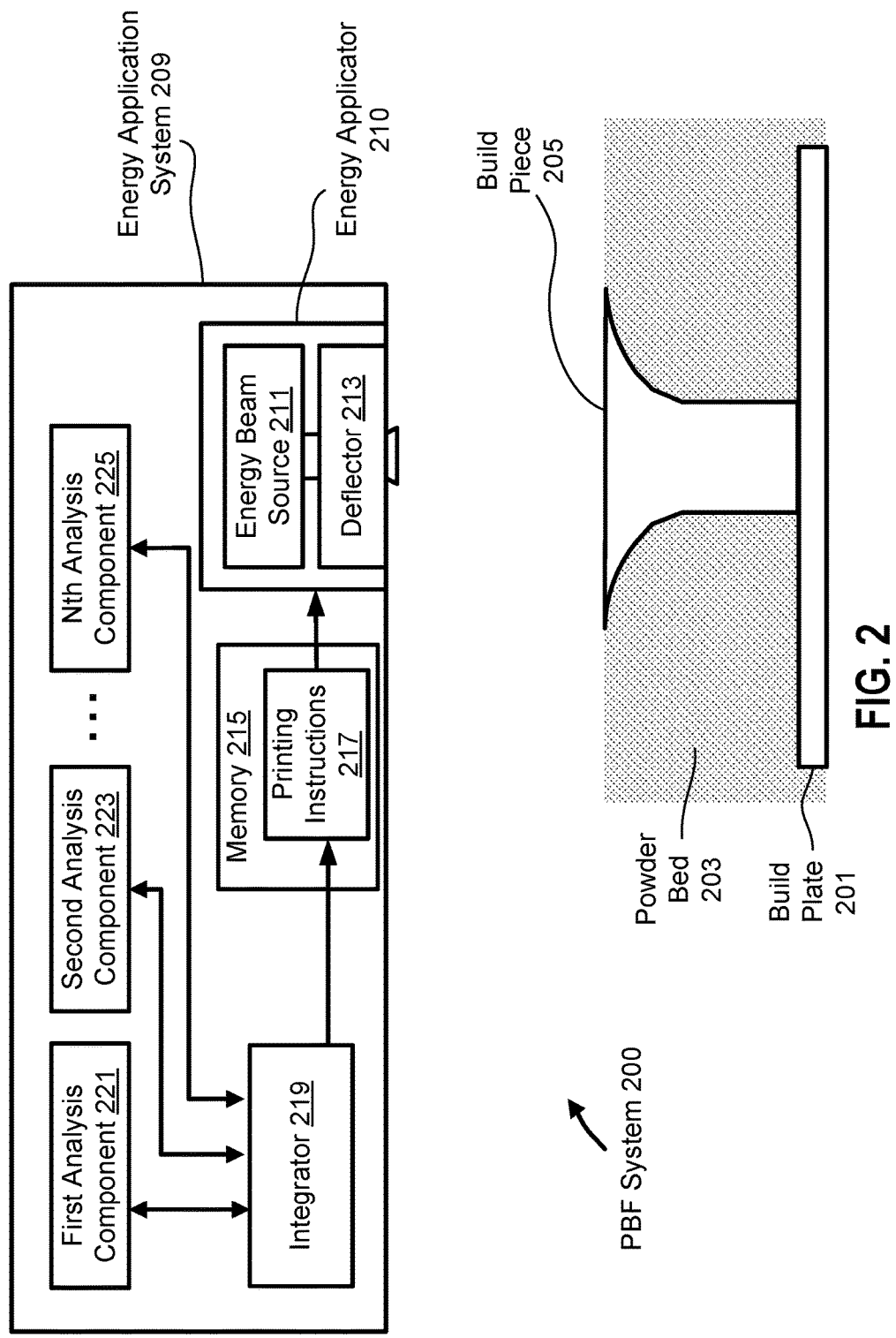
FIG. 2 illustrates an exemplary 3-D printer including multi-factor design integration.

FIG. 2 illustrates an exemplary 3-D printer, e.g., a PBF apparatus 200, including multi-factor design integration. FIG. 2 shows a build plate 201, a powder bed 203, and a build piece 205. An energy application system 209 can apply energy to fuse powder material in deposited powder layers. For the purpose of illustration, the powder depositor is not shown in this figure. Energy application system 209 can include an energy applicator 210, which can include an energy beam source 211 and a deflector 213. Energy application system can also include a computer memory 215, such as a RAM, computer storage disk, etc. Memory 215 can store printing instructions 217. Printing instructions 217 can include instructions for each powder layer in the printing process, and the instructions can control how energy beam source 211 and deflector 213 scan each powder layer. For example, printing instructions 217 can control printing parameters such as scan rate, beam power, location of beam fusing, etc.

In this example, printing instructions 217 can be determined by an integrator 219 based on multiple factors of design. Specifically, integrator 219 can send information based on a design model of a vehicle or vehicle part (e.g., a component for a transport structure) to multiple analysis components, such as a first analysis component 221, a second analysis component 223, and an Nth analysis component 225. Each analysis component can modify the information based on an analysis factor corresponding to the analysis component. Each analysis component modifies the information based on a different analysis factor than the other analysis components. For example, first analysis component 221 may analyze the information to determine the aerodynamic characteristics of the design model. In this case, first analysis component can be, for example, a computer program that calculates aerodynamic characteristics based on exterior shape information of the design model. Second analysis component 223 may analyze the information to determine a durability of the design model. In this case, second analysis component can be, for example, a computer program that calculates durability characteristics based on information of the materials that are currently selected for various structures of the design model. The analysis components can send the analyzed information to integrator 219.

Integrator 219 can receive the analyzed information from the analysis components and update the design model based on the analyzed information. Integrator 219 can then determine whether the updated design model satisfies criteria for the vehicle. For example, the criteria may include a maximum aerodynamic coefficient of drag, for which the information returned by the aerodynamic analysis component would be most relevant. In another example, the criteria may include a minimum number of stress cycles before failure, for which the information returned by the durability analysis component would be most relevant.

If the updated design model satisfies the criteria, integrator 219 can determine printing instructions 217 for a 3-D printer to print one or more structures of the vehicle based on the updated design model. On the other hand, if the updated design model does not satisfy the criteria, integrator 219 can send information based on the updated design model to the analysis components. In this case, the analysis components can analyze the information based on the updated design model. In this way, for example, integrator 219 can integrate analysis disparate analysis information into an updated design model, and if the updated design model does not satisfy all criteria for the vehicle, the process can repeat the process to iteratively approach the state of satisfying all of the criteria.

FIG. 3 shows components of an exemplary multi-factor design integration system. The design integration system may include multiple levels of design refinement 301. In some embodiments, the multiple levels of design refinement 301 of a design product may be performed using various analysis factors. In various embodiments, analysis factors 303 may be analyzed and evaluated during the design optimization at the multiple design refinement levels 301. It shall be understood that the term optimization herein includes customization or personalization of design choices and may be interchangeably used throughout this description.

As shown in FIG. 3, the design refinement levels 301 may include a Macro level, a Mid level, and a Micro level. For a vehicle structure design, the Macro level may correspond to a vehicle level, the Mid level may correspond to a node level, and the Micro level may correspond to a material level. It should be noted that there are various ways to define the levels and degrees of design refinement. There may be more or fewer than three levels included in the topology optimization. In some embodiments, the levels of design refinement may be defined dependent on the modularity of the design product.

In some embodiments, one or more of the multiple analysis factors 303 may or may not be based on physics, i.e., physical analysis. FIG. 3 shows a list of exemplary analysis factors 303 to be considered for a vehicle design. The various analysis factors may include areas considered for vehicle design in traditional automobile engineering disciplines such as NVH (noise, vibration, and harshness), aerodynamic, fuel economy/emissions, durability/corrosion, package/ergonomics, vehicle dynamics, linear finite element analysis (FEA)/stiffness, environmental impact, etc. Additionally, the various analysis factors may also include elements that are related to 3-D printed structural design such as node location, composite materials, thermal, and existing parts bin/system cost, etc. In some embodiments, these analysis factors may or may not be related to physics-based analysis, such that they may cover a broad spectrum of areas from traditional fundamental disciplines (e.g., performance) as mentioned previously to lifecycles areas such as manufacturability, styling, supportability, environmental impact, economy and cost, etc.

In some embodiments, an analysis factor may refer to a design engineering attribute or discipline that may include a component for simulation test or analysis. The component may be configured to analyze a product from a specific area based on mathematical or empirical models. The component within a simulation architecture may be implemented as computer code such as the varieties of software programs mentioned previously. The module may require one or more input variables of a design model and may generate dependent outputs optimized towards or tested for a specific criterion or criteria.

In some embodiments, the multiple analysis factors may be analyzed or evaluated using components that can be implemented as software programs or computer codes. Available CAD (computer aided design) and CAE (Computer Aided Engineering) simulation analysis software programs and/or Multiphysics software packages may be used for the various analysis factors.

In some embodiments, multiple analysis factors may be analyzed simultaneously using one or more Multiphysics models. Multiphysics methods such as single discretization and/or multiple discretization methods may be involved in the analysis of multiple physical models or multiple simultaneous physical phenomena. Various open source software packages and commercially available software packages may be used for simulating multiphysics models (coupled physics) based on finite element method or other commonplace numerical methods.

In some embodiments, each analysis factor may be analyzed individually and the analysis results from various components may be integrated and evaluated using an integration program as described later herein.

The multiple variables may be involved in the design optimization process at various stages. In some embodiments, one or more variables may be involved in an iteration of design optimization process simultaneously according to the criteria of the design product or layer.

A degree of design optimization may be based on modularity. In some embodiments, the present disclosure provides a design optimization method that may include multiple degrees or levels of modifications and alterations to refine a design during an optimization process.

In a traditional design optimization process, some aspects of a design model are usually fixed and difficult to be altered or changed compared to design variables. The present disclosure, however, can provide a method that allows aspects of a 3-D printed structure based design to be altered and adjusted at various levels, and may significantly improve the optimization result. In some embodiments, the different levels of design refinement may involve modifying and adjusting various properties of parts or components that may or may not be 3-D printed.

Figure 4:
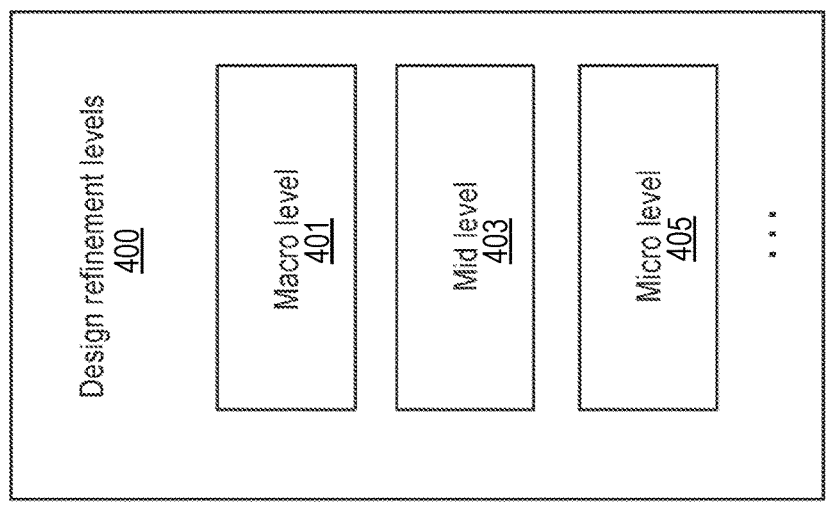
FIG. 4 illustrates exemplary levels of design refinements.

FIG. 4 illustrates exemplary levels of design refinements 400. In some embodiments, 3-D printed structures may be modified and/or optimized at different levels. Taking 3-D printed node-based structures as example, in a topology optimization process as shown in FIG. 4, three design refinement levels 400 may be included for design refinement.

In some embodiments, a Macro level 401 optimization may include modifications and alterations at a structure level. For example, if the design product is a vehicle including multiple subassemblies or subsystems, during the Macro level 401 optimization, the number and placement of subassembly or subsystem components in space may be varied. In another example of a vehicle chassis design, the material topology may be adjusted by region and locations of 3-D printed junctures (nodes) to achieve the best performance.

In some embodiments, a Mid level 403 optimization may include modifications and alterations to components at a sub-structural level relative to Macro level 401. For example, for a vehicle chassis based on 3-D printed node structures, the Mid level 403 may refer to the node level. In this case, the node level optimization may refine a variety of properties of the nodes, such as shape, size, structure, the connecting angles between tubes and joints, and nodes, fine features (e.g., centering, connecting, and collapsing features), connecting and adhesive materials, etc.

In some embodiments, a Micro level 405 optimization can include modifications to micro-structural properties of the materials. In some embodiments, the properties of the materials may be at millimeter or sub-millimeter scale. The properties of the materials may include but are not limited to materials type, layer thickness for adhesive, porosity, alloy, impregnation, ion implantation, weave direction, skeletonization, pore suffusion, etc. In some embodiments, the Mid level components (e.g., nodes, panels, junctions) may include internal structures. For instance, panels may be formed by imposing porosity, skeletonizing, or forming internal honeycomb structures to reduce material volume, weight, or cost. When high-strength, light-weight materials are desired to achieve fuel efficiency goals, honeycombs, foams, truss lattice structures and any other suitable 2-D or 3-D structures may be adopted. The form of these microstructures can be optimized to provide certain performance benefits. For example, a 3-D Kagome lattice structure (originated as a weave pattern) may be identified by topology optimization as an optimal structure superior to other structures (e.g., tetrahedral, pyramidal truss, hexagonal, etc.) based on its elastic modulus for a range of fraction volumes. The properties of the selected material may be further optimized by changing dimensions, materials, and arrangement of components within the structure. Such 3-D printed structures and materials include those described in WO 2015/175892 entitled "Modular formed nodes for vehicle chassis and their methods of use" and WO 2016/003982 entitled "Systems and methods for fabricating joint members" which are incorporated by reference herein in their entirety.

It should be noted that there are various ways to define the levels and degrees of design refinement. In some embodiments, the levels of design refinement may be defined based on the specific design product. For instance, if the design product is a portion of the vehicle chassis, the levels may include only the Mid level and the Micro level refinements. In some embodiments, one or more variables and/or parameters of a design model from different levels may or may not be modified simultaneously in one iteration cycle. Moreover, topology optimization is discussed herein as an example, and additional structural optimizations may also be involved such as size, weight and stiffness, number of constituent elements, and shape optimization.

Figure 5:
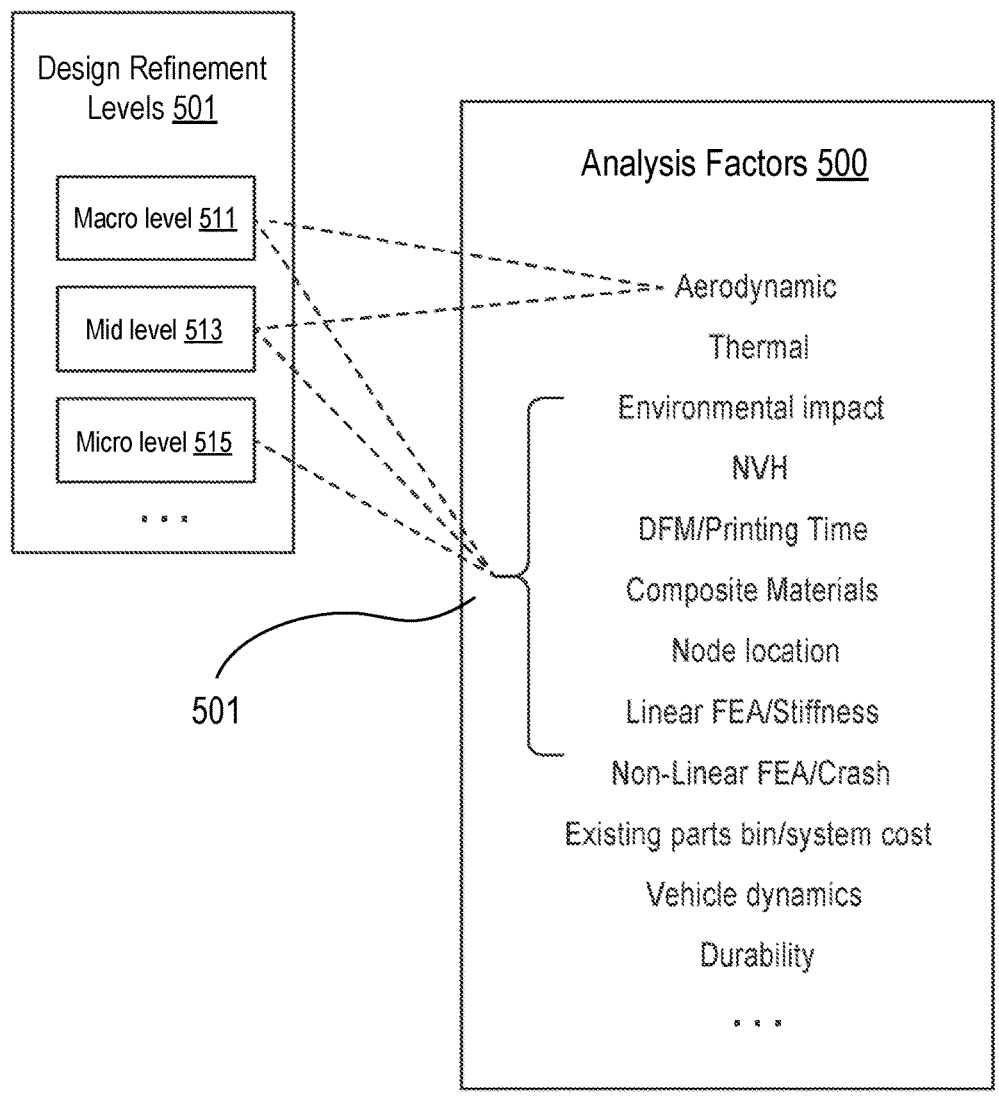
FIG. 5 shows a list of exemplary factors to be considered for a vehicle chassis design.

In some embodiments, multiple analysis factors considered in designing and optimizing a 3-D printed structure based object may be analyzed or optimized at the multiple levels. FIG. 5 shows an exemplary relationship between the multiple analysis factors 500 and the multiple levels of design refinement 510.

The multiple analysis factors may include design disciplines such as NVH (noise, vibration, and harshness), aerodynamic, fuel economy/emissions, durability/corrosion, package/ergonomics, vehicle dynamics, linear FEA/stiffness, environmental impact, etc. Additionally, the various factors may also include elements that are related to 3-D printing such as node location, composite materials, thermal, and existing parts bin/system cost, etc. These analysis factors may or may not be related to physics and may cover a broad spectrum of areas from traditional fundamental disciplines (e.g., performance) to lifecycles areas such as manufacturability, supportability, economy and cost, etc.

In some embodiments, the multiple analysis factors may include components that may be implemented as software programs or computer codes. In some embodiments, multiphysics methods such as single discretization and/or multiple discretization methods may be involved in the analysis of multiple physical models or multiple simultaneous physical phenomena.

The analysis regarding the multiple factors may be involved in a design optimization process at various stages. In some embodiments, one or more of the factors may be involved in an iteration of design optimization processes simultaneously according to the criteria of the design product.

In some embodiments, the analysis method may use one or more modules. In some cases, a module may refer to a software program that is configured to analyze a single analysis factor. In other cases, a module may refer to a software program that is configured to analyze multiple factors during optimization. The module may be configured to analyze a product from a specific area based on mathematical or empirical models. The module within a simulation architecture may be implemented as computer code such as the varieties of software programs mentioned previously. The module may require one or more input variables of a design model and generate dependent outputs optimized towards or tested for specific criteria.

In some embodiments, the one or more variables of the design model may be modified or adjusted at one or more design refinement levels. Multiple factors may be grouped together and optimized simultaneously. For instance, as shown in FIG. 5, in an iteration of optimization, multiple analysis factors may be analyzed and evaluated simultaneously 501, while multiple variables of the model from one or more design refinement levels may be adjusted.

In some embodiments, multiple design analysis factors may be analyzed and optimized simultaneously, e.g., in parallel, in a design process. In some embodiments, an integrator may be included to oversee the analysis and optimization of the various analysis factors.

Figure 6:
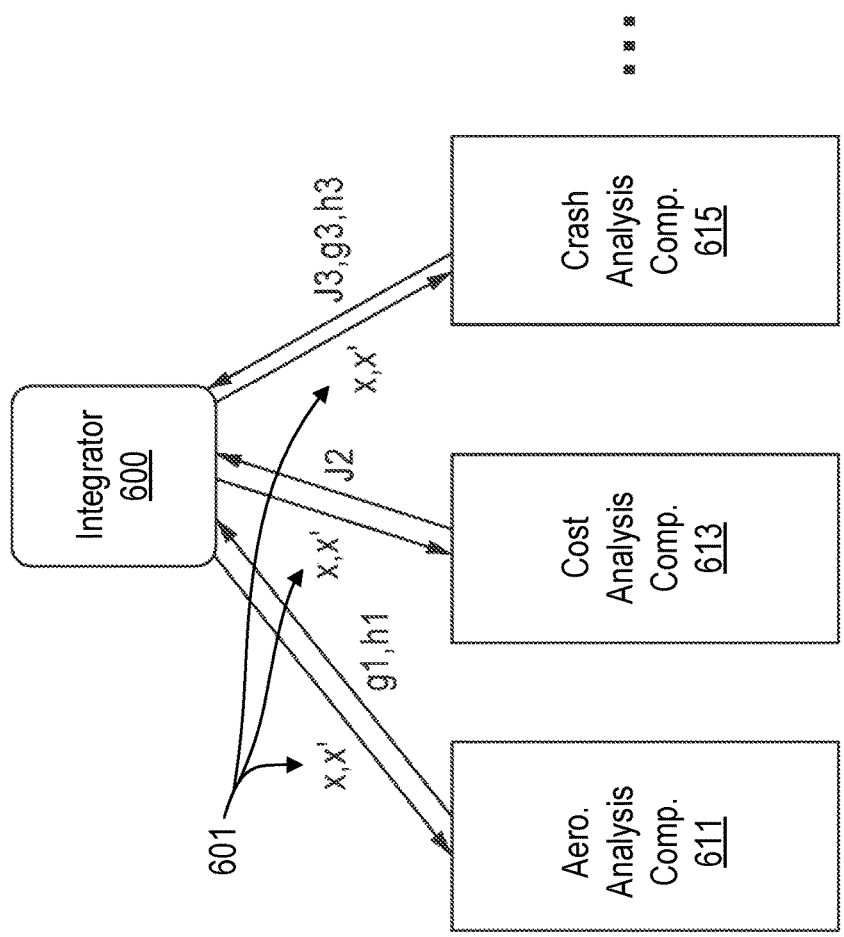
FIG. 6 shows an exemplary schematic framework in a design optimization process including factors of various disciplines.

FIG. 6 shows an exemplary schematic framework in a design optimization process including analysis factors of various disciplines. Multiple analysis factors may be optimized or analyzed simultaneously. In various embodiments, these analysis factors may correspond to different design disciplines. In some embodiments, several analysis factors may be coupled together. In some cases, one analysis factor may be analyzed by a corresponding analysis component, such as an aerodynamic analysis component 611, a cost analysis component 613, and a crash analysis component 615. In various embodiments, a single component may perform analysis of multiple factors.

In some embodiments, various components for analyzing various factors may be coupled or interrelated. For instance, an input variable of one component may be a constraint of another component causing feedback loops at a system level, an overall product level, etc. In some cases, these feedback loops may be caused within an iteration leading to a delay in the optimization process. The present disclosure may improve the design process by decoupling the multiple analysis factors using multiple refinement levels as previously described. For instance, the flexibility in selecting design variables may allow for an optimal and efficient information flow during an iterative optimization process.

In some cases, the coupled analysis components may share the same design input variables x 601 with criteria in different analysis factors to achieve. For example, aerodynamic analysis module 611 may require design variables x and constraints/requirements g1 and h1, cost analysis module 613 may require the same design variable x and design objective J2, and crash analysis component 615 may require the design variable x, design objectives J3, and constraints g3 and h3. In some embodiments, the objectives and constraints of the multiple analysis factors such as g1, h1, j2, j3, g3, and h3 may or may not conflict. In the cases in which conflicting optimization objectives exist, an integrator 600 may be included integrate the analysis components. In various embodiments, integrator 600 can communicate with users if necessary to decide tradeoffs among the conflicting objectives based on user preferences.

In various embodiments, during the optimization, the integrator 600 may communicate with multiple the analysis factor modules. In some embodiments, the analysis factor modules may be instructed by the integrator 600 to run tests to analyze one or more performance characteristics of the design under certain conditions and submit the analysis result to the integrator 600 for evaluation and decision. The integrator 600 may analyze the received individual analysis result and determine a new value of design variable x, which can be designated x'. Subsequently, the new value, x', may be provided to the multiple analysis factor components to update the current design. Multiple iterations may be included until an optimized result is achieved. In some embodiments, the integrator 600 may keep track of the design variables and analysis results of each version of the design model by storing the data in a database. For example, as shown in FIG. 6, the integrator 600 may instruct the aerodynamic analysis component 611 and the cost component 613 to run analysis and tests on the current design model simultaneously. The test results from aerodynamic analysis component 611 and cost analysis component 613 may be transmitted to integrator 600 for evaluation. Based on the evaluation of the integrated test results against overall design criteria, the integrator may determine new values for variables, such as variable x, to update the current model and instruct the analysis components to repeat the analysis based on the updated model. In some embodiments, one or more iterations may be performed until an optimized result is achieved.

The multiple analysis components may optimize the current design model within each component in addition to analysis, such that the design model may be modified within each analysis component. Accordingly, a resulting optimized design model along with the test evaluation may be submitted to the integrator 600. In some cases, the analysis components may perform tests in parallel. In other cases, an analysis component may perform analysis without input from the other analysis components, and integration with results of other analysis components can be performed in a piecemeal fashion. The integrator 600 may provide the analysis components with design tasks to be optimized within each component respectively.

In either schematic framework, iterations of optimization refinements may be requested either by the integrator 600 or the various individual analysis components. In either case, the optimization refinements can be performed at multiple levels such as the macro level, mid level, and micro level as previously mentioned.

In some embodiments, the integrator 600 may be implemented as a customized tool (e.g., software program, API, computer code) to interface to existing structural simulation and analysis software programs and instruct some or all of the analysis programs to run in a batch fashion, to quickly provide a complete report of all characteristics of a design, and to communicate with each analysis program as described elsewhere herein.

In some embodiments, the various analysis, optimization and design processes may be implemented in software programs on a device. The device may include a processor and/or a memory. The memory may include non-transitory computer readable media including code, logic, or instructions for performing one or more actions, such as the design actions or computations. The processor may be configured to perform the actions in accordance with the non-transitory computer readable media. The device may be a desktop computer, cell, smartphone, tablet, laptop, server, or other type of computational device. The device may be in communication with a 3-D printer. The 3-D printer may print various structures according to the design developed by the optimization and design processes. The 3-D printer can be configured to generate an object through additive and/or subtractive manufacturing. The 3-D printer can be configured to form a metallic object, composite object, polymer object, etc. The 3-D printer may be, for example, a direct metal laser sintering (DMLS) printer, electron beam melting (EBM) printer, fused deposition modeling (FDM) printer, a Polyjet printer, etc. The 3-D printer may print objects made of, for example, titanium, aluminum, stainless steel, structural plastics, other structural materials, etc.

In many cases, a design optimization may involve several criteria that conflict with each other (e.g., cost, mass, deformation) to be analyzed and optimized simultaneously. FIG. 7 Part A illustrates an example of analysis factors with conflicting criteria. In this example vehicle design optimization, Factor1 and Factor2 may represent two analysis factors that conflict (e.g., such that improving one factor can worsen the other), for example, vehicle handling vs comfort, visible safety features vs vehicle mass, simplicity vs flexibility, aerodynamics vs shape, masculine vs feminine styling, etc.

In some embodiments, methods in design optimization may be used during the design process to achieve optimized solutions in spite of multiple conflicting factors. These approaches may include for example, weighted sum approach, weighted metric methods, goal programming, physical programming, Pareto-optimality, etc. For instance, the various conflicting criteria from the design analysis factors may be weighted and summed to represent a goal of a design, such that the aggregate objective function may express the preferences of the user (define weighting factor) and thus can be optimized using traditional techniques to find a single optimal solution to the multi-objective problem. In other instances, optimization may be performed before requiring user's preference or goal information. In this case, a set of optimal solutions (e.g., Pareto optimal) may be identified and used for guiding users to input preferences.

In some embodiments, a Pareto-filter approach may be used to obtain optimized solutions in a multi-objective optimization process. FIG. 7 Part B shows an example of Pareto efficient frontier. In this approach, a Pareto frontier or Pareto set may be calculated as the set of optimal solutions to a multi-objectives optimization. By restricting or focusing attention to the set of choices that are optimal solutions, a designer or user can make tradeoffs within this set, rather than considering the full range of every parameter, thus accelerating an optimization procedure. A number of methods (e.g., adaptive weighted sum, normal boundary intersection) can be used to calculate the Pareto frontier.

In some embodiments, the identified optimal solutions (e.g., Pareto-frontier) may be provided to users. This may allow users to make design decision and tradeoffs based on their preferences such that a preference-driven design optimization may be achieved. In some embodiments, the tradeoffs within the Pareto frontier set/optimal solutions may be determined based on user preference. In some embodiments, users may be allowed to select focus factors and set up a preference level among multiple factors within a constraint space. In some embodiments, the constraint space may refer to a space where all of the fundamental requirements are met and additional optimization potential is available.

In some embodiments, the tradeoffs and preference options may be provided to users by visual representation and users may be prompt to select the factors that are of greater interest to determine tradeoffs or preference levels. Details about preference selection are as described elsewhere herein.

In some embodiments, the optimal solutions may be used to determine the available factors that can be selected and a range or restricted space for the tradeoff levels. In some cases, the constraint space may refer to the scale limit of the tradeoff levels within which users are allowed to set the tradeoffs. For example, based on different analysis results of a current model (e.g., optimal solutions), a loose or tight scale limit of the tradeoff level for the same group of focus factors may be provided and users may be permitted to adjust the proportion or level of the tradeoff within that limit. In some embodiments, the available factors and tradeoff scales may be determined based on a design headroom.

In some embodiments, a design headroom may be determined based on the optimized solutions. The design headroom may refer to a design capacity that can be identified when one or more previous analysis test results exceed a set of minimum requirements. In some embodiments, there may exist a collection of optimal solutions (e.g. Pareto frontier) exceeding all of the minimum requirements, in which case, the collection of optimized solutions that are in the excess space may be evaluated and provided to users in the form of levels of preferences with respect to correlated factors that can be selected. In some embodiments, the design headroom may be different along the direction of the specific factors preferred by the user (i.e., focus factors).

In one aspect of the disclosure, a method of design optimization for 3-D printed nodes based structures is provided. In some embodiments, the method may allow for a user preference-driven design.

Figure 8:
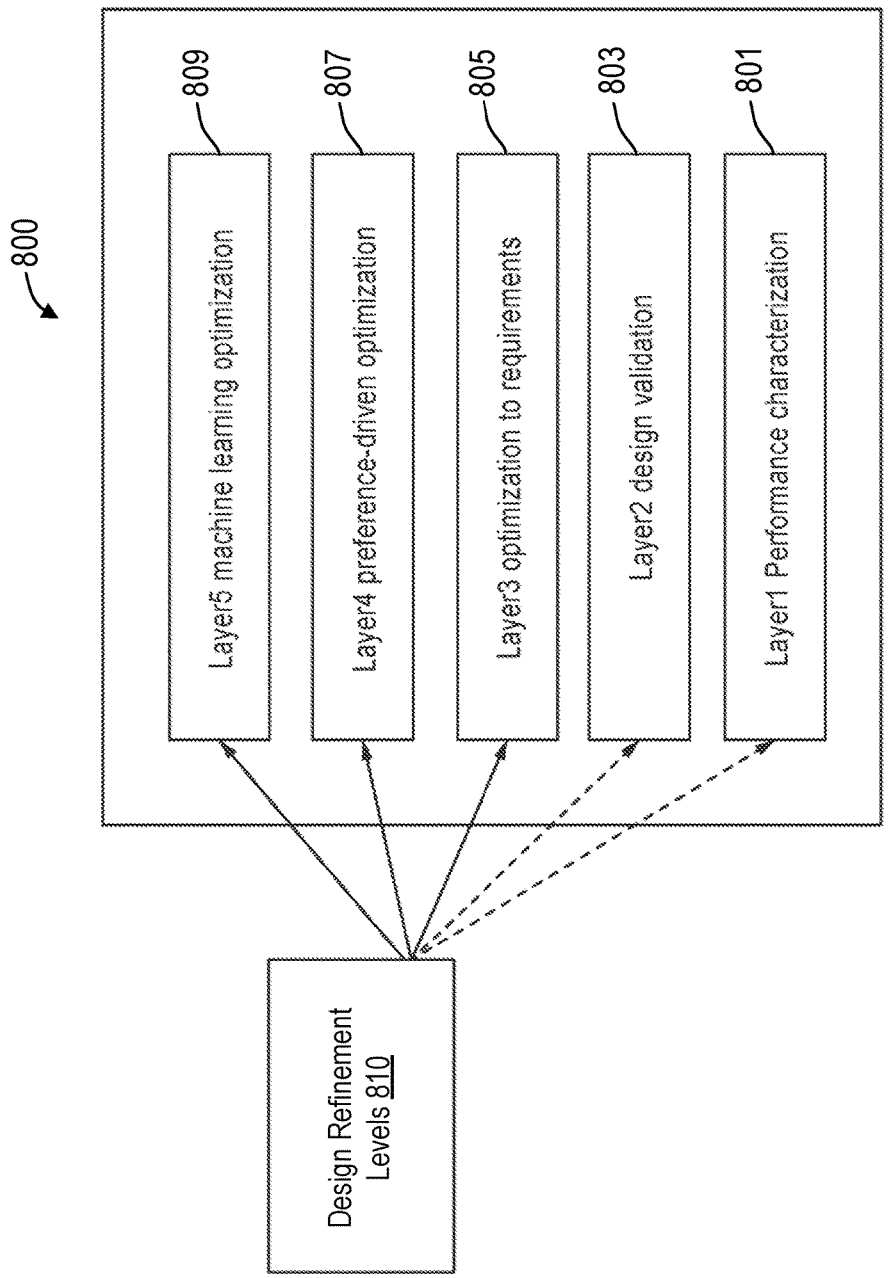
FIG. 8 illustrates an exemplary multi-layer design process.

In some embodiments, the design process may include a series of design optimization layers. FIG. 8 illustrates an exemplary five-layer design process 800, in accordance with some embodiments.

In some embodiments, at different layers, design refinement at multiple design refinement levels 810 may be involved. For example, as shown in FIG. 8, optimization may be involved in layer 3 (805), layer 4 (807), and layer 5 (809), and during the optimization process at these layers, the design model may be modified at multiple levels 810 including the micro level, mid-level, and macro level as described elsewhere herein.

The design process 800 may include a series of design optimization layers as shown in FIG. 8. In some embodiments, the different layers may correspond to different level of design analysis and optimization depth. For example, the five layers may compose a hierarchy that ranges from a simple analysis 801 to complete machine learning based design of structures 809. During a design process, the five layers need not to be performed in a sequential manner. In some embodiments, one or more iteration cycles may be included in a layer. In some embodiments, the number of iteration cycles included in different layers may be different. In some embodiments, in each layer, a similarly iterative tactic may be used either sequentially or in parallel, but the level of design analysis and modification may increase according to the increasing level of design objectives in each layer.

In some embodiments, the different layers may involve design optimizations for different criteria (objectives). In some cases, different criteria may be brought into the design process 800 at different layers. For example, criteria related to Layer 1 (801) may include a few basic or performance requirements of the design product, criteria related to Layer 3 (803) may include requirements in many disciplines (e.g., economy, manufacturing, etc), criteria related to Layer 4 (807) may include user (customer) preferences, and criteria related to Layer 5 (809) may focus on further improvement of the design in terms of physical (real-world) performance. In some cases, the design criteria involved in different layers may be defined at various time points by various means. For instance, the basic performance requirements can be pre-defined and stored in a database, whereas the user preferences may be input by users in the middle of a design process.

In some embodiments, layer 1 (801) of the design process 800 may be defined by providing analysis of a reference model. In the subsequent layer 2 (803), multiple sets of performance characteristics of the reference model under multiple test conditions may be evaluated against a set of pre-defined minimum requirements. In layer 3 (805), the model/design may be altered iteratively until all the requirements (e.g., user desired requirements, pre-defined requirements, etc.) are met. In layer 4 (807), one or more customer-preferences options may be provided to users based on a design head-space identified from previous results, and the input from users may be incorporated into a preference-driven design procedure. In layer 5 (809), further refinements may be applied to the design based on actual product data such as manufacturing performance and product performance, and physical test data such as field test.

Layer 1

In some embodiments, design operations in layer 1 (801) may include a baseline performance characterization. In some embodiments, a design process may begin with analysis and design at the level of layer 1 (801). In some embodiments, if a vehicle chassis is the design product, layer 1 (801) may include selecting a seed/initial vehicle chassis structure and characterize it using physical simulation and analysis software. The seed/initial model may be selected from multiple copies of design based on the specific design product. For example, if the design product is a part of a vehicle such as an instrument panel, then an initial panel model may be provided from a historical library of panel designs.

In some embodiments, the seed model may be initially selected according to some minimum requirements. For example, a library of vehicle chassis designs may contain record of some or all characteristics of a design, by quickly comparing the record of the design against some minimum requirements, a reference design/seed model may be selected. The requirements may be pre-defined and stored in a historical database, or may be input by a user.

In some embodiments, the seed/initial design model may be referred to as reference design. The reference design may be selected from a database that stores multiple reference designs under various categories. Details regarding the database will be described later herein. In some embodiments, the multiple designs may be categorized according to the mechanical structures such that different categories may represent different structures. For example, a vehicle chassis reference design may be selected from a category of vehicle chassis, and similarly a vehicle body reference design may be selected from a collection of vehicle body references. The multiple designs may be categorized by other ways, such as by function, for example. Any suitable classification means may be adopted according to the specific design product. In various embodiments, the design process might not start with a reference design selected from a database, and in this case, an initial model may be manually created from scratch. For example, a chassis design model may be generated in a computer-aided design (CAD) software program, such as AutoCAD, Autodesk, SolidWorks, pro/Engineer or Solid Edge. Optionally, the chassis design model may be generated in a simple, custom design tool tailored to the 3-D printed nodes based space frame design.

In some embodiments, a reference design stored in the database may include a parametric CAD (computer aided design) model. The parametric CAD model may include a parametric description of the model. For example, for a vehicle design, the parametric description of the vehicle may include its structure, tires, engines, doors, transmission, cooling system, etc. In some embodiments, the parametric description may include three-dimensional descriptions of each component and how they are attached with each other. In some embodiments, the parametric description may also include materials properties such as glass, metal, rubber and plastic used in the model.

Tables 1, 2, and 3 are examples of various characteristics of vehicles made with nodes, connectors, sub-assemblies, and chassis modules. One or more characteristics listed in the tables may be recorded as database entries and may be retrieved when the design model is selected as a reference design. In some embodiments, these database entries may also be used for fabricating vehicles or modifying a vehicle design.

Table 1 includes exemplary characteristics for a vehicle chassis reference model.

Table 2 includes exemplary characteristics for a chassis module.

| Module level: | Min | Max |
|---|---|---|
| Number of Nodes in Modules | 2 | 20 |
| Number of Panels in Modules | 0 | 15 |
| Number of Tubes in Modules | 6 | 100 |
| Dimensions of modules (mm) | 100 | 1500 |
| Shapes of modules: pyramid triangle, square, trapezoid, 2d 3 d, etc. | any polytope including polyhedron, tetrahedron, icosidodecahedron, rhomic triacontahedron, great cubicuboctahedron, polygon, triangle, quadrilateral, pentagon, hexagon, heptagon | |
| Mix of node sizes (x smaller than L, y larger than L) | 100 smaller than 200 mm^3; 100 larger than 200 mm^3 | |
| number of crumple zones | 0 | 8 |

Table 3 includes exemplary characteristics for nodes, connectors and/or panels

| | Min | Max |
|---|---|---|
| Nodes/junctions/panels: | | |
| Size of joints (mm) | 0.1 | 100 |
| Wall thickness (mm) | 0.1 | 50 |
| Number of injection ports (1-6, think multi joint connections) | 1 | 6 |
| # of o-rings | 0 | 5 |
| shape of bars (number of sides) | 2 | 10 |
| number of crumple features | 0 | 4 |
| Tubes per node | 1 | 10 |
| Nodes/panel | 1 | 10 |
| Junctions per node | 0 | 8 |
| rivets per node | 0 | 50 |
| Fasteners per node | 0 | 50 |
| Weight of Panels | 100 g | 100000 g |
| Weight of Joints | 10 g | 10000 g |
| Inserts per Panel | 0 | 1000 |
| reinforcements per panel | 0.1 | 10 |
| spreader plate thickness (mm) | 2 | 4 |

| Vehicle level: | Min | Max |
|---|---|---|
| Number of Nodes in Vehicle | 10 | 200 |
| Number of Panels in Vehicle | 0 | 150 |
| Number of Tubes in Vehicle | 10 | 1000 |
| Number of Modules in Vehicle | 1 | 10 |
| Vehicle torsional stiffness (Nm/deg) | 1000 | 30000 |
| Range of vehicle mass (lbs) | 600 | 23000 |
| Number of wheel wells for wheel attachments | 0 | 18 |
| Number of crumple zones | 0 | 8 |
| Library of structures containing standard parts for fast design (tubes from x thickness and y, from x +/− z) | Diameter: 1 to 100 mm | |
| | Wall thickness: 0.5 mm to 10 mm | |
| | Length: 10 mm to 6000 mm | |
| Max vehicle x-axis deceleration during impact on NHTSA tests | 0 | 100 g |
| Max vehicle y-axis deceleration during impact on NHTSA tests | 0 | 100 g |
| Max vehicle z-axis deceleration during impact on NHTSA tests | 0 | 40 g |
| Max passenger x-axis deceleration during impact on NHTSA tests | 0 | 100 g |
| Max passenger y-axis deceleration during impact on NHTSA tests | 0 | 100 g |
| Max passenger z-axis deceleration during impact on NHTSA tests | 0 | 40 g |
| Node features to achieve deceleration above (crumple zones, low density regions, breakaway structures, printed force diverting structures) | 0 | 10 |
| Range of module volume reduction based on impact (0-z) | 0 | 10 |

-continued

|  | Min | Max |
|---|---|---|
| reinforcement printed strut forks (2 for pencil brace to 4 for complex major support) | 1 | 20 |
| materials | (Al, Ti, Steel, etc) | |
| Internal Structure: | | |
| Bone like (wall thickness) (mm) | 0.01 | 5 |
| Geometric features (characteristic length) (mm) | 0.1 | 1000 |

In layer 1 (801), after a reference design is determined, the reference model may be characterized and analyzed by one or more physical simulation and analysis software programs to establish a performance baseline of the reference model. For example, for a vehicle body structure design, the performance baseline may include the performance of the vehicle body in multi-disciplinary load cases such as crash (non-linear transient), NVH (frequency domain), stiffness (linear static), durability (linear static), aerodynamics (CFD), etc.

Various methods that are able to perform simulation tests may be used. The simulation test may be static or dynamic, deterministic or stochastic, continuous or discrete, etc. As mentioned previously, various models of test may also be involved (e.g., physical model, empirical model, etc). Various available CAD (computer aided design) and CAE (Computer Aided Engineering) simulation analysis software program such as ANSYS, AutoCAD, Autodesk, SolidWorks, Nastran, Fluent, or pro/Engineer and Multiphysics analysis commercially available software may be used to test and evaluate the performance characteristics of the reference design.

In some embodiments, a customized software program may be provided to interface to existing structural design software and instruct some or all of the analysis programs to run in a batch fashion, to quickly provide a complete report of all characteristics of a design.

In various embodiments, multiple software packages can be launched as multiple simultaneous simulations, which can allow the measurement of several different aspects of vehicle performance simultaneously. In various embodiments, the multiple software packages may be launched sequentially. Multiple copies of the same software can be launched for testing the same parameters of performance under various sets of test conditions. For example, a same vehicle model can be run on the same test track using the same software under a variety of weather conditions: hot summer, cold winter, rainy, and snowy-icy roads. The test spectrum of results captured in this test may offer a condensed, high level snapshot of all-season performance.

In some embodiments, the multiple simulation tests can be run on the same computer. Optionally, the multiple simulation tests may be run on multiple computers that may or may not communicate via a network allowing for a rapid parallel performance characterization. In some embodiments, hundreds or thousands of tests may be run in parallel such that a broad set of performance characteristics can be collected in a short time. For example, in the case of the all-season test, each seasonal variation may be executed on a separate computer. The range of test plans and conditions can be tailored as needed to suit special vehicle capabilities.

In some embodiments, the performance baseline may include one or more characteristics of the reference model as results of one or more tests. In some embodiments, the tests may be simulation tests that evaluate one or more characteristics of the reference model against a set of criteria. The one or more performance characteristics may include, for example, load carrying capability, crash and fault safety, vehicle NVH (noise, vibration and harshness) performance, durability, stiffness, etc. For instance, the simulations may provide analysis results about how various components of the vehicle may move or deform during a scenario, such as a crash. In another example, the analysis may include a temporal test regimen—for instance the performance of vehicle may be evaluated by running a test of the vehicle starting at zero speed, accelerating at a given ramp rate to a maximum, maneuvering through several poses, and decelerating back to zero.

In some embodiments, the performance characterization of the reference design may be assessed and tested under a set of fundamental/minimum requirements. For example, for a vehicle body structure design, the fundamental/minimum requirements may include multi-disciplinary load cases such as crash (non-linear transient), NVH (frequency domain), stiffness (linear static), durability (linear static), aerodynamics (CFD), etc. In some embodiments, these fundamental requirements may be inherited from a reference design. In some embodiments, these fundamental requirements may be modified according to certain rules or tailored from scratch. For example, the requirements may include operating rules set by governing or licensing bodies, federal safety standards, fuel and emission standards, roadway condition descriptions, environment descriptions, etc. These requirements may vary according to where the vehicle will be operated: which country jurisdiction and according to the purpose of the vehicle (e.g, a utility truck, passenger commute car, emergency response vehicle, or a race car). In some embodiments, these fundamental requirements may be defined at the start of a design process.

Layer 2

As shown in FIG. 8, Layer 2 (803) may refer to design validation. In some embodiments, performance results from Layer 1 (801) may be evaluated and analyzed to verify whether the reference design meets a set of requirements. In some cases, the requirements may include fundamental functional performance criteria and safety requirements to meet. For example, the requirements may specify the basic functions and product behavior and characteristics under stress and fault conditions. In another example, the requirements may include operating rules set by governing or licensing bodies, federal safety standards, fuel and emission standards, roadway condition descriptions, environment descriptions, etc. These requirements may vary according to where the vehicle will be operated, e.g., which country jurisdiction, and according to the purpose of the vehicle (e.g., a utility truck, passenger commute car, emergency response vehicle, race car, etc.).

In some embodiments, some requirements may be input by a user. For example, the requirements for a system level design may be input by a user using a user-friendly interface. An example of vehicle requirements interface is shown in FIG. 9. As shown in FIG. 9, users may be allowed to input requirements of the design using a drop-down menu. For instance, users may be provided with options to input country of registration, vehicle class, crash rating, ground clearance, homologation, headlamp class, emission class, etc. For illustrative purpose, a drop-down menu is shown, however it should be noted that different scales may be provided by the user and various means may be employed to allow a user input or define the requirements. FIG. 9 shows an example sub-menu that specifies detailed vehicular crash test requirements. The overall crash rating requirement is broken down into individual requirements for each specific crash test.

In some embodiments, a design model may be assessed by multiple simulation tests to determine whether or not the model meets a requirement. In some embodiments, a simulation test may evaluate a performance of the reference design under various physical test conditions. In some embodiments, one or more sets of test conditions may be predefined and stored in a database. The test conditions may include, for example, ambient temperature and humidity, atmospheric pressure, wind speed and direction, and solar radiation load. The test conditions may also include measuring a design model's performance at various moments, such as daytime, nighttime, or at different location such as an equatorial, or higher-latitude test. For example, a set of test conditions may be set so extreme as to induce a vehicle failure, then the performance or failure rate of the design model may be recorded as a result of the test.

In some embodiments, the specifications and test result for a design may be represented by numerical vectors. According to the specific test, the numerical vectors may be multi-dimensional. In some embodiments, the design specification may be represented by a numerical vector that may include pass-fail for certain dimensions. The pass-fail performance vector may be generated by evaluating the result of simulation test against the requirements, then a score indicative of the level of pass or fail of a requirement may be calculated. In some embodiments, various test results may be quantified against the corresponding requirements such that the performance test result may be represented in the form of a vector of numerical readings. The vector may include, for example, measures of fuel consumption, gradeability, and temperature under a specific drive cycle. The vector may also incorporate time sequences complied over standardized journeys or drive-cycles.

Layer 3

Layer 3 (805) may refer to the level in which the design model is optimized and altered to meet all the requirements as previously described. Based on the pass-fail performance vectors challenged and addressed in Layer 2 (803), the reference model (design) may be automatically altered with modifications intended to bring its performance into compliance with all requirements. In some embodiments, the present disclosure may permit the variables of the model to be modified at multiple refinement levels (e.g., Macro level, Mid level, Micro level, etc.) as previously described. The flexibility in terms of adjusting parameters of a design model may ensure a design meeting all the minimum requirements. Each version of the modified model may be evaluated, and the results may be used to guide subsequent modifications. When a single objective design optimization is involved, optimization methods or algorithms such as global optimization, local derivative-free optimization, local gradient-based optimization, Heuristic methods, etc., may be used. When the requirements include conflicting objectives or multiple disciplines, the design may be modified using the optimization method as previously described.

Layer 4

Layer 4 (807) may refer to the design optimization at a user preference-driven level. In this layer, user preferences may be brought into the optimization procedure and guide the design direction. In some embodiments, the user preferences may be restricted and provided according to design headroom. The design headroom may be identified when the individual characterization scores from Layer 3 (803) contain capacity that exceeds the minimum requirements. This excess "design capacity" represents headroom that can be expended at this level.

At Layer 4 (807), further optimization may take into account the user preferences. A user may be allowed to select one or more focus properties, tradeoff or preference levels, etc. In some embodiments, a custom software program may be used to guide a user input of one or more preferences. In some embodiments, the software program may be configured to provide a list of adjustable properties to users for selection and generate one or more items based on the selected properties and inter-coupling relationships within a collection of properties, where an item may be a context group including at least one selected property and one or more coupled/interrelated properties, and a range for users to adjust the tradeoff or preference level within the group of properties. The software may be further configured to display the items by providing visual representations of the items to the users for them to set the preference level or tradeoffs, to update the range of adjustable tradeoffs dynamically based on the tradeoffs set for the other items, and to provide instant results to users to assist making tradeoff decisions.

In some embodiments, the list of adjustable properties may include primary properties and secondary properties. In some cases, the primary properties may be generic properties of a vehicle from customer perspective or properties directly related to customer desire/experience at a product level, such as comfort, vehicle top speed, etc. In other cases, the primary properties may be the properties that are less coupled to or interrelated with other properties such that the less computation or iterations may be involved. In some embodiments, the secondary properties may refer to properties from engineering perspective that may be in the form of engineering design requirements, such as dimensions, weights, and materials, etc. However, many other means may be used to define the primary and secondary properties. Both of the primary and secondary properties can be directly linked to or transformed into the various factors as previously described.

In some embodiments, only the primary properties may be displayed to the users. In other embodiments, a list of adjustable properties from either primary or secondary or both may be provided to users for selection. In some embodiments, the properties displayed to users may be determined based on a historic priority or interest level of these properties. In some cases, the priority or interest level may be derived from historic data indicating a user interested areas or properties. In some embodiments, the properties displayed may be determined based on user specific information retrieved from a database. In some embodiments, the adjustable properties provided to users may be determined based on the current optimization result and the evaluated potential performance.

In some embodiments, the items may be graphic, representing groups of coupled properties. In some embodiments, these coupled properties may be referred to as focus properties. In some embodiments, the focus properties may also be referred to as focus factors.

When one or more adjustable properties are coupled to a selected property, one or more items may be automatically displayed to users for making a tradeoff decision. In some embodiments, the coupled or linked properties may be determined based on a coupling relationship as described previously. For example, the coupling relationship may include different properties affected by the same input variables, an input variable of a property is affected by an output of another property, or different properties having conflicting criteria, etc. In some embodiments, the coupling relationship may be predetermined based on the various modules such as the modules as previously mentioned and stored in a database. When the coupled properties are determined to be adjustable, they may be displayed to users for making a tradeoff decision.

An item may contain any number of focus factors that can be grouped together and displayed to users. An item may contain at least one selected factor and interrelated unselected factors. An item may contain factors all of which are selected factors. In some embodiments, the item may display a group of factors and the coupling relationship within the group to users.

Figure 10A:
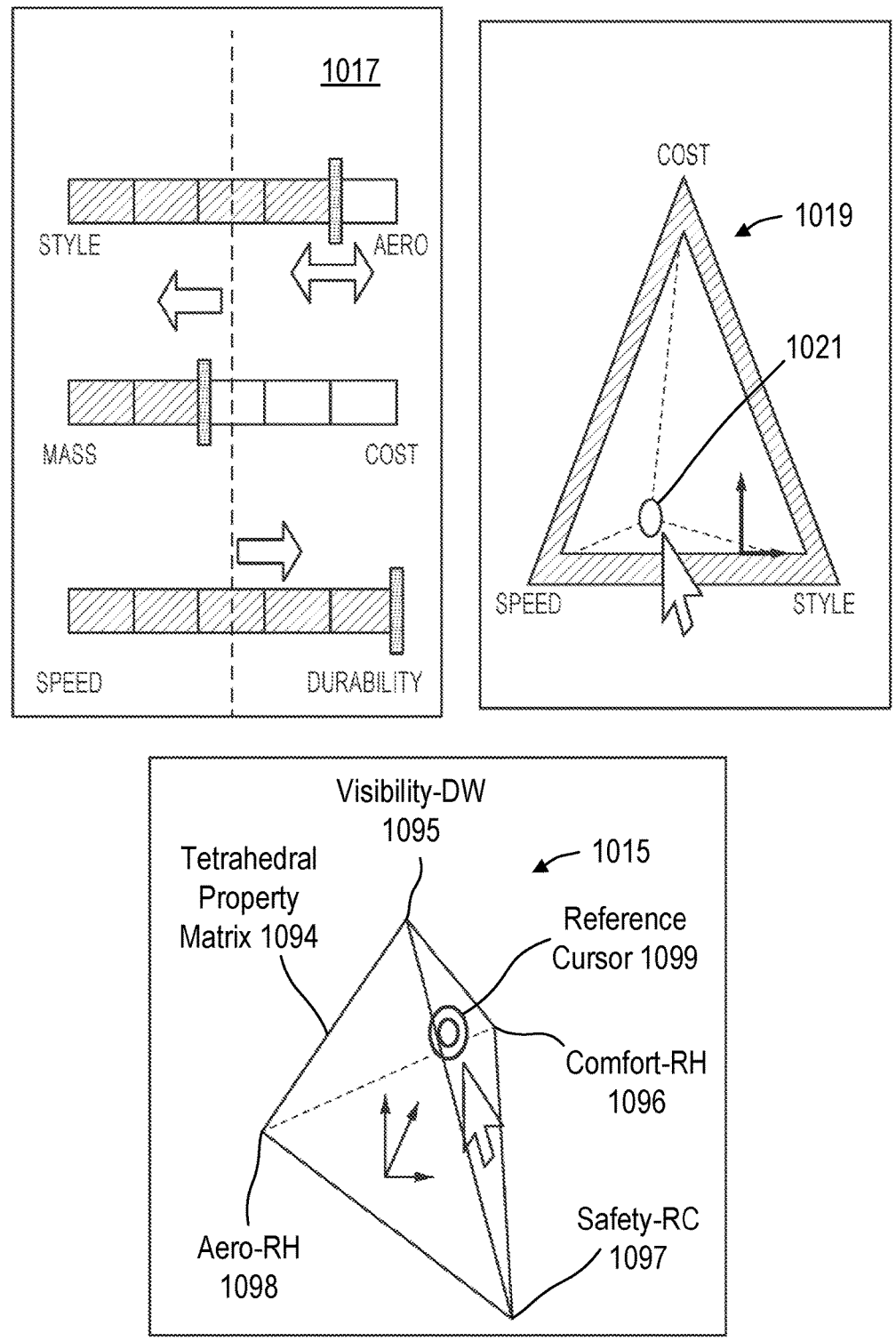
FIG. 10A shows examples of visual representation of focus factors and tradeoff options for user-preference-driven design.

FIG. 10A shows examples of visual representation of focus factors and tradeoff options for user-preference-driven design, in accordance with some embodiments. For example, two focus factors may be represented by a slider bar which may allow a user to select a tradeoff level or preference level between the focus factors by selecting a location of the bar. In the example 1017, users may be allowed to use a cursor to move the tradeoff level between the focus factors style and aerodynamics. In some embodiments, upon adjusting the tradeoff level for one pair of focus factors, the preference/tradeoff level of other coupled factors may be automatically calculated and presented to users instantly.

In another example, three focus factors may be visualized by a triangle with a movable object representing the proportion or tradeoff level among the three factors. By adjusting the position of the movable object within a confined space, users can easily provide personal preference to guide a design process. For instance, as shown in FIG. 10A, users may be allowed to move the reference cursor 1021 to determine a tradeoff between the three focus factors cost, speed, and style.

In other embodiments, more than three focus factors may be represented by a 3-D visual representation 1015. For example, a tetrahedral 1015 may be used. In the 3-D representation example, each vertex may represent a focus factor and the surfaces of the tetrahedral may form to a constraint space. Users may be allowed to move the reference cursor to determine a preference among the multiple focus factors.

In some embodiments, the preference is provided to users within a constraint space. A range of tradeoff level may be indicated in the visual presentations. For example, the range may be presented by the left and right limit of the slider bar 1017 or the edges of the triangle 1019.

It should be noted that other shapes (e.g., bar, pyramid, cube, circle, sphere, etc) or other forms (e.g., numerical, graphical, etc) of representation may be provided to users for visualizing the selected focus factors and deciding tradeoffs. The representation may be 2-D images such as the slider bar 1017 and triangle 1019, or 3-D images such as the tetrahedral 1015.

In the example of triangle 1019, the reference cursor 1021 may be moved in any direction in a two-dimensional plane. The moving range may be restricted by the edge of the triangle. In some embodiments, an available design space may be represented by highlight area within the triangle shape indicative of potential design headroom. Each vertex may represent a focus factor (e.g., cost, speed, and style). The position of the cursor may correspond to a proportion of preference or tradeoff level among the three factors. For instance, the distance between the preference cursor and each vertex may be proportional to the preference level. In other cases, the distance may be inverse proportional to the preference level.

In the 3-D representation example 1015, each vertex may represent a focus factor (e.g., Aerodynamics, safety-RC, comfort-RH, and Visibility-DW) and the surfaces of the tetrahedral may represent a potential design space. In some embodiments, the constraint space or the available design space may be portrayed graphically as a highlighted area or volume inside tetrahedron 1015.

In some embodiments, users may be provided with restricted scale of customization in terms of the available focus factors that can be selected and related tradeoff levels. In some cases, the constraint space may refer to the factors that can be selected (adjustable factors) which may be determined by the optimized solutions. In some cases, the constraint space may refer to the scale limit of the tradeoff levels within which the users are allowed to set the tradeoffs. For example, based on different analysis results of the current model, a loose or tight scale limit of the tradeoff level for the same group of focus factors may be provided, and users may be permitted to adjust the proportion or level of the tradeoff within that limit. In some embodiments, the available factors and tradeoff scales may be determined based on design headroom or constraint.

In some embodiments, design headroom may refer to a design capacity that can be identified when one or more previous analysis test results (e.g. individual characterization scores obtained from Layer 3 (805)) exceeds a set of minimum requirements. In some embodiments, a collection of optimized solutions (e.g. Pareto frontier) may exceed all of the minimum requirements, in which case the collection of optimal solutions that are in the excess space may be evaluated and provided to users in the form of levels of preferences with respect to correlated factors that can be selected. In some embodiments, the design headroom may be different along the direction of the specific factors preferred by the user (i.e., focus factors).

In some embodiments, the focus factors presented to the users may not be the same design analysis factors as described previously. In some cases, methods such as Quality Function Deployment (QFD) may be used to translate engineering factors into a form that addresses customer needs. For instance, an engineering factor (e.g. node location, printing time, etc.) may be transformed into customer demands related factor (interior comfort, cost, etc.). In some embodiments, customer needs may include basic tradeoffs between economy, performance features, size, and styling, and other derived attributes.

In some embodiments, the input from users may indicate a design preference and may be implemented as requirements/constraints and/or objectives for further design optimization. In some embodiments, the input (e.g., focus factors and preference/tradeoff levels) from users may be transformed into engineering requirements/constraints, objectives or test plans for further optimization process. Methods such as QFD may be used to translate the users' requirements into engineering requirements. After the user preference is transformed into engineering analysis factors, analysis of current model may be performed to evaluate the model against the new requirement (derived from the user preference input) then the design may or may not be modified for further optimization according to the analysis result.

In some embodiments, a visual representation of the design may be presented to the users in real-time or near real-time to assist users making preference decisions. This visual representation may reflect an instantaneous design impact introduced by the tradeoff or preference input by the user. In some embodiments, the instant result may be a test result previously saved in a database such that no computation or simulation test is required. In other embodiments, the instant result may be a calculation based on a new combination of previously test results that may not require a lengthy computation cycle. In other embodiments, the result may be obtained from an optimization process. Based on the specific focus factors selected by the user and level of tradeoffs, the corresponding changes to the structure design may or may not be visible in a graphic model. In some cases, users may be able to visualize instant changes in the appearance of the model such as shape, size, number of components, etc. In other cases, users may be allowed to visualize the changes in a numerical form, such as tables, diagrams, analysis maps, etc. In some embodiments, a set of visual representations corresponding to different versions of design may be presented to users for comparison and selection. In other embodiments, users may be allowed to "test drive" the model in a dynamic simulation to evaluate the behavior that has been altered, and when the desired performance "feel" is achieved the preference setting may be locked down. Various means may be provided for users to virtually test drive a vehicle, such as animation, virtual reality, etc.

Figure 10B:
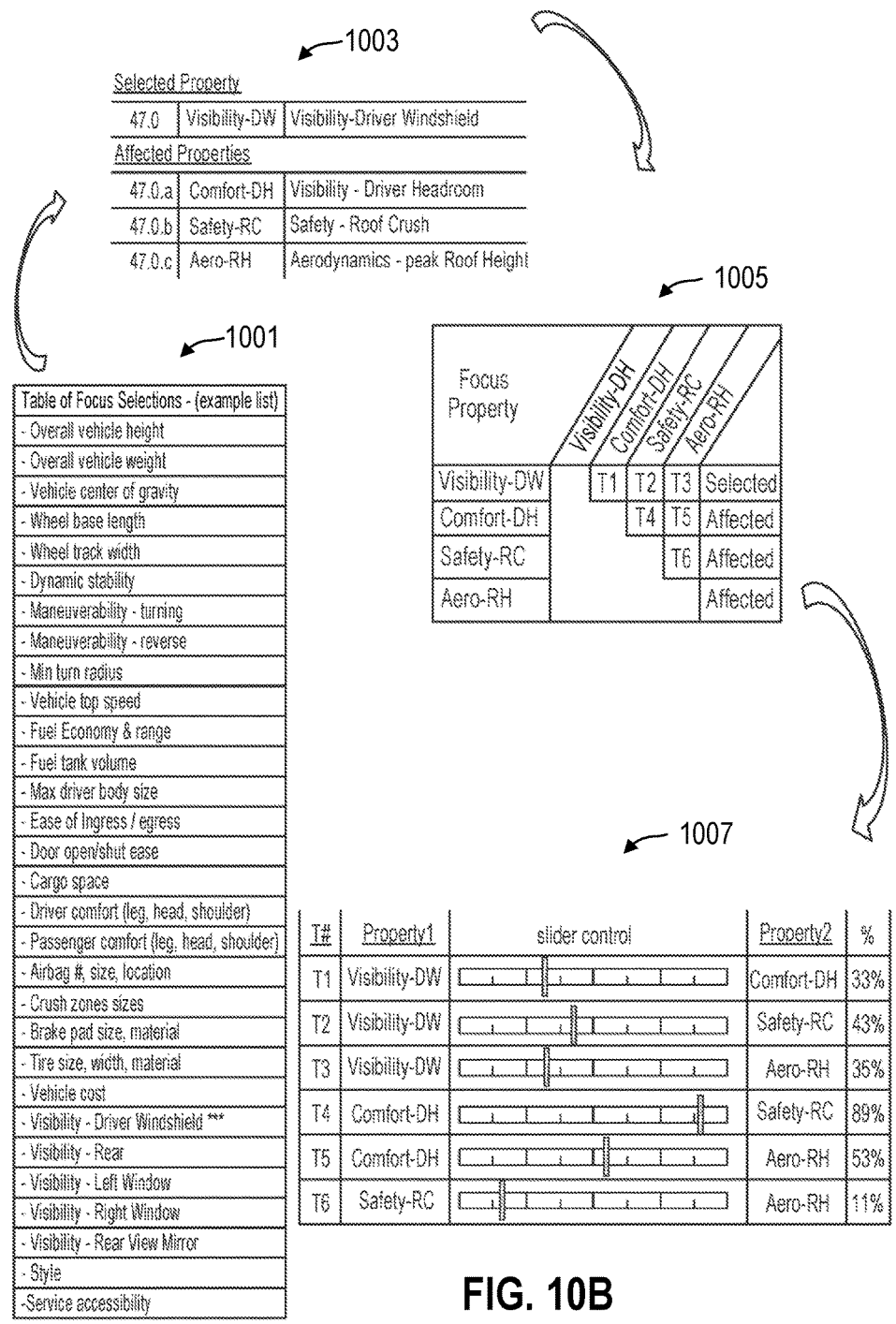
FIG. 10B-C illustrate an example of design optimization at the preference-driven level.
Figure 10C:
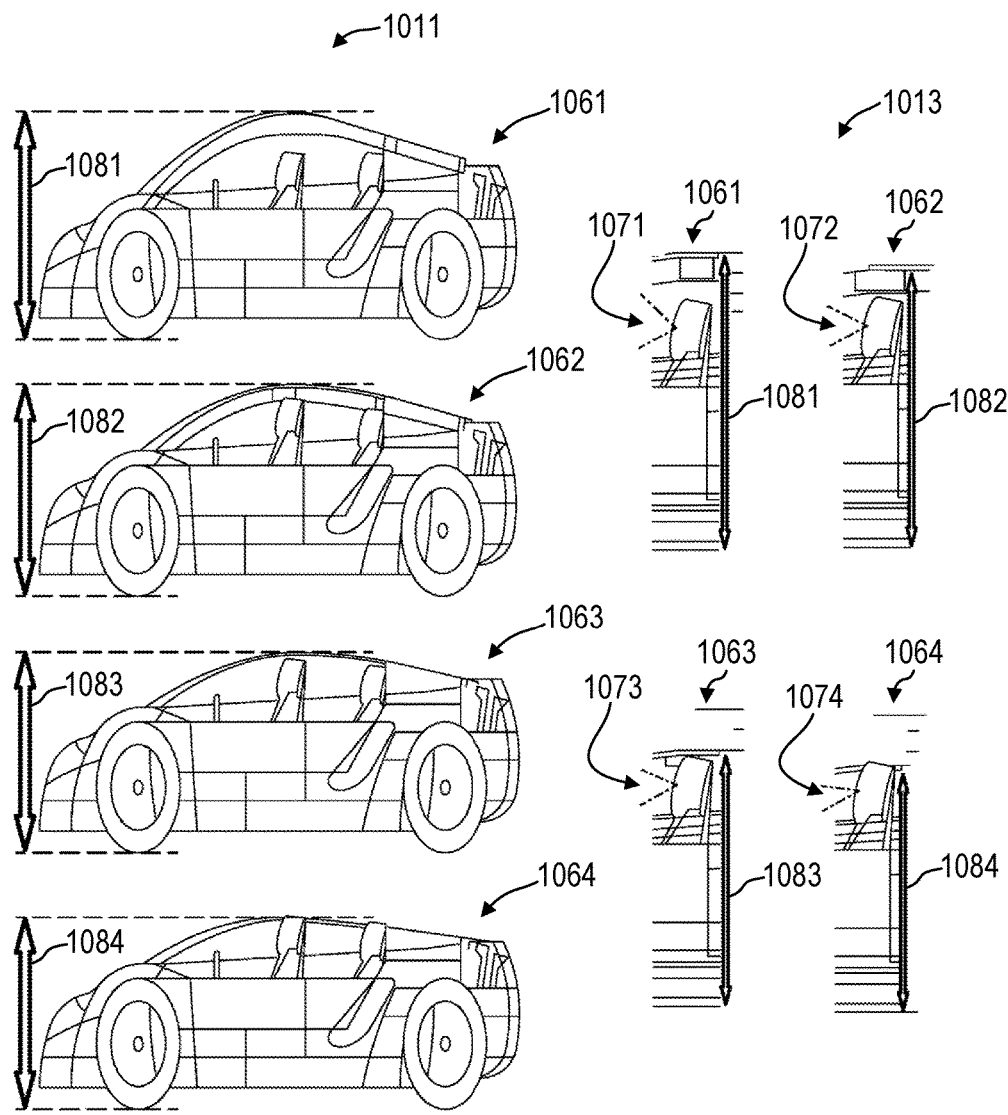

FIG. 10B-C illustrates an example of design optimization at the preference-driven level, in accordance with some embodiments. In the example, the design object is a vehicle. Prior to the process at the preference-driven layer, a baseline vehicle design may have been evaluated by a simulation test. For instance, a user may find the driver's visibility through the windshield is insufficient for the current design 1063 by running a vehicle model driving simulation.

A list of adjustable properties 1001 may be provided to the user. Any suitable form may be used to display the list of adjustable properties, such as drop-down list, tables, charts, pictorial representations, etc. The user may select one or more properties for adjustment. In this example, "Visibility-Driver Windshield" (Visibility-DW) may be selected from the list. Upon the selection of the Visibility—DW property, a number of linked/coupled or affected properties such as comfort-driver headroom, safety—roof crush, aerodynamics—peak roof height may be automatically identified and displayed to users 1003. Additionally, a graphic representation of the current model with the property annotated or illustrated may be displayed to the user. In some cases, the annotated property may be a property or factor highly correlated with or associated with the focus properties and presented to users for illustration purpose. In this example, four different vehicle heights 1081-1084 are displayed to represent the windshield (visibility-DW) property as shown in FIG. 10C. A relaxation of the vehicle height restriction may allow for a larger or more vertically inclined windshield glass to provide improved forward road visibility for the driver.

As shown in FIG. 10C, a range of adjustments to the vehicle height may be affected by the adjustment. Four versions of design models 1061-1064 correspond to four different heights 1081-1084 and the third model 1063 represents the baseline model.

The table 1005 may be a cross-matrix of all the identified focus properties containing the coupling relationships. For example, as shown in the table 1005, the coupling relationship may be identified and represented by six pairs: T1, T2, T3, T4, T5, and T6.

Further, each pair of focus properties may be displayed with a user-selectable slider control 1007 and a user may or may not elect to adjust the slider. The user may be prompted to decide a preference level or tradeoff between a pair of properties by adjusting the position of the slider.

As previously mentioned, the coupling relationship may be represented in many other ways. For example, the same list of focus properties can be shown in the form of a tetrahedron 1094 in FIG. 10A. This may be shown on-screen with live update as the sliders are moved. Each of the four properties may be mapped to one vertex of the tetrahedron (Visibility-DW 1095, Comfort-DH 1096, Safety-RC 1097, and Aero-RH 1098). Each edge may represent a paired permutation of two properties, for a total of six edges. Each trade slider T1, T2, T3, T4, T5, and T6 represents a point along one of the six edges. Each pair's slider setting percentage can be represented as a point that lies along the edge.

In some cases, a graphical representation of the vehicle model correspond to a tradeoff selection may be instantly displayed to a user 1011. Users may be allowed to immediately visualize direct and indirect changes on the design model as a result of their expressed tradeoff preferences.

Figure 10D:
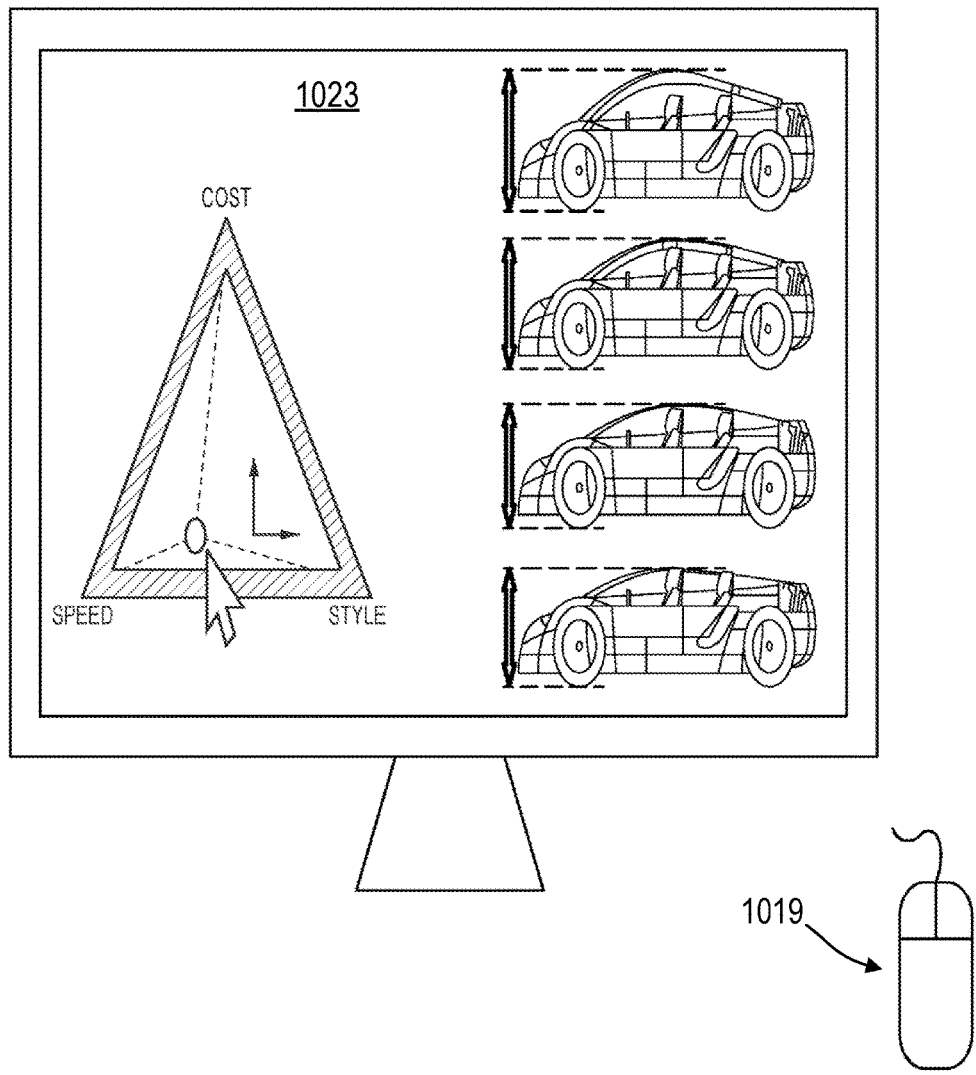
FIG. 10D illustrates examples of devices providing graphical user interface and user interaction.

In some embodiments, the visual representation of focus factors and tradeoff options for user-preference-driven design and visual representation of the design may be displayed to user on a device. FIG. 10D illustrates examples of devices providing graphical user interface and user interaction, in accordance with embodiments of the disclosure. In some embodiments, the device may be a computing device. The device may include a display 1023 to display the visual representations for user input preference. The display screen may or may not include touch-sensing input capability. The device may include a processor and/or a memory. The memory may include non-transitory computer readable media including code, logic, or instructions for performing one or more steps, such as the design steps or computations. The processor may be configured to perform the steps in accordance with the non-transitory computer readable media. The device may be a desktop computer, cell, smartphone, tablet, laptop, server, or any other type of computational device. The device may be in communication with a 3-D printer. The device may or may not be a network device. In some embodiments, the device may be capable of connecting a network, such as a local area network (LAN), wide area network (WAN) such as the Internet, a telecommunications network, a data network, or any other type of network.

In some embodiments, users may be allowed to move the preference cursor via a user interactive device 1019. Examples of such user interactive devices may include a keyboard, button, mouse, touchscreen, touchpad, joystick, trackball, camera, microphone, motion sensor, heat sensor, inertial sensor, or any other type of user interactive device.

Layer 5

Referring back to FIG. 8, Layer 5 (809) may refer to the level of machine-learning optimization. At this level, design optimization may involve data from actual products and/or experiments with physical models. In some embodiments, a database of designs, manufacturing experience, design experience, manufacturing performance, and product performance, etc., may be compiled and regularly updated. For example, data stored in the database may include feedback that is generated after a delivery of a component or product, so it captures the final outcomes from the process. Outcomes may be, for example, either satisfactory or unsatisfactory. For example, the database may include data collected from a full life-cycle of the products. The collection of data may include product manufacture (starting at mining/pre raw materials), the design process, manufacturing, delivery, field use, and eventual recycling. In another example, historic data gathered from similar products' performance under various real conditionals may be recorded and analyzed. In some embodiments, for a vehicle design database, the data may further contain information related to customers such as preferences, habit, driving behavior, etc. Knowledge and patterns may be extracted from the database using techniques such as machine learning, neural network analysis techniques, etc.

In some embodiments, information extracted from the database of physical data may be used to guide further modification and refinement to the design models. For instance, customer behavior related information may be factored into the design optimization process to achieve a personalized final design product. Information learnt from actual physical products may improve the design optimization and deliver a product that is difficult to be achieved only based on the conventional mathematical models and numerical simulations.

Figure 11:
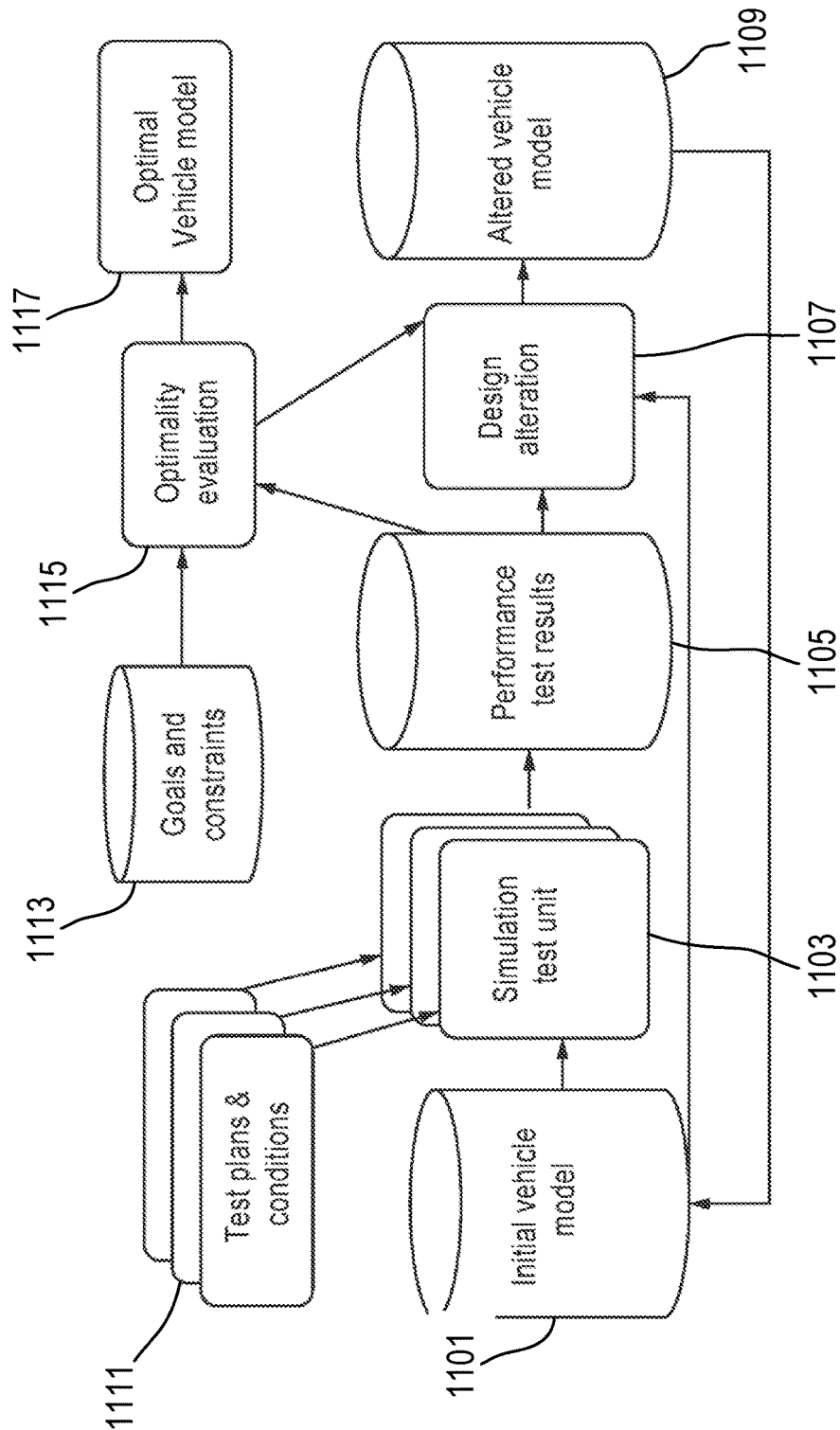
FIG. 11 shows a diagram of data flow through an exemplary design optimization cycle.

FIG. 11 shows a diagram of data flow through an exemplary design optimization cycle. In some embodiments, one or more optimization cycles may be involved in the multiple layers in the present disclosure. Various 3-D printed structure-based objects as previously mentioned can be optimized by the presented method. The following embodiment uses vehicle structure design as example; however, the optimization method can be applied to any subsystem such as an engine or a tire of the vehicle, or be used for the design of other non-motor-vehicle structures.

In some embodiments, the design optimization cycle may start with a parametric CAD (Computer Aided Design) model 1101 of a vehicle. The initial vehicle model 1101 may contain a complete parametric description of the vehicle, such as the structure, tires, engine, doors, transmission, cooling system, etc. The initial vehicle model 1101 may include three-dimensional descriptions of each component and how they are attached with each other. The initial vehicle model 1101 may also contain materials properties for the various glass, metal, rubber, and plastic components. As described previously, a database may be used to store numerous design models that can be used as initial design.

Test Plan & Conditions 1111 may be a predefined set of tests prescribed for the vehicle. In some embodiments, test plans may include various simulation modules implemented as a set of computer-encoded instructions, and the test conditions may include a set of parameters to be applied to the corresponding test plans for various testing purposes. Simulation test unit 1103 may take the vehicle model 1101 and Test Plans & Conditions 1111, and performs a simulation test with an analysis software. For example, the simulation program 1103 may subject the model to a set of simulated stressful maneuvers that may elicit behavioral extremes, and measurements of the performance may be taken at appropriate moments.

Test Plan and Conditions 1111 may describe a physical test process to evaluate how the model performs under a number of predetermined test situations. For example, the test conditions may specify for example ambient temperature and humidity, atmospheric pressure, wind speed and direction, and solar radiation load (for daytime, nighttime, equatorial, or higher-latitude test). In another example, the test conditions may include multi-disciplinary load cases such as crash (non-linear transient), NVH (frequency domain), stiffness (linear static), durability (linear static), aerodynamics (CFD), etc. Some test conditions may be so extreme as to deliberately induce a vehicle failure. Finding and measuring where or how a failure occurs can be the key feature of a test. For instance, the simulations may provide an indication of how various components of the vehicle may move or deform during a scenario, such as a crash. In another example, the analysis may include a temporal test regimen—for instance the performance of vehicle may be evaluated by running a test of the vehicle starting at zero speed, accelerating at a given ramp rate to a maximum, maneuvering through a list of predetermined waypoints, speeds, turns, or obstacles, and decelerating back to zero.

Simulation Tests unit 1103 may include a set of software packages that can be launched as multiple simulations. The set of software packages may or may not be run simultaneously. In some embodiments, the software packages may be instructed to perform tests according to each own plan and conditions, as specified by the Test Plan and Conditions 1111. This plurality of simulation tests may allow the measurement of several different aspects of vehicle performance. Various simulation analysis software may be used for the analysis such as ANSYS, AutoCAD, Autodesk, SolidWorks, Nastran, Fluent, or pro/Engineer may be used for the various design analysis.

In some embodiments, multiple software packages can be launched as multiple simultaneous simulations that allow the measurement of several different aspects of vehicle performance simultaneously. In other embodiments, the multiple software packages may be launched sequentially. Multiple copies of the same software can be launched for testing the same parameters of performance under various sets of test conditions. For example, a same vehicle model can be run on the same test track using the same software under a variety of weather conditions: hot summer, cold winter, rainy, and snowy-icy roads. The test spectrum of results captured in this test may offer a condensed, high level snapshot of all-season performance.

In some embodiments, the multiple simulation tests can be run on the same computer. Optionally, the multiple simulation tests may be run on multiple computers that may or may not be communicated via a network allowing for a rapid parallel performance characterization. In some embodiments, hundreds or thousands of tests may be run in parallel such that an extremely broad set of performance characteristics can be collected in a short time. For example, In the case of the all-season test, each seasonal variation may be executed on a separate computer. The range of test plans and conditions can be tailored as needed to suit any special vehicle capabilities.

Figure 12:
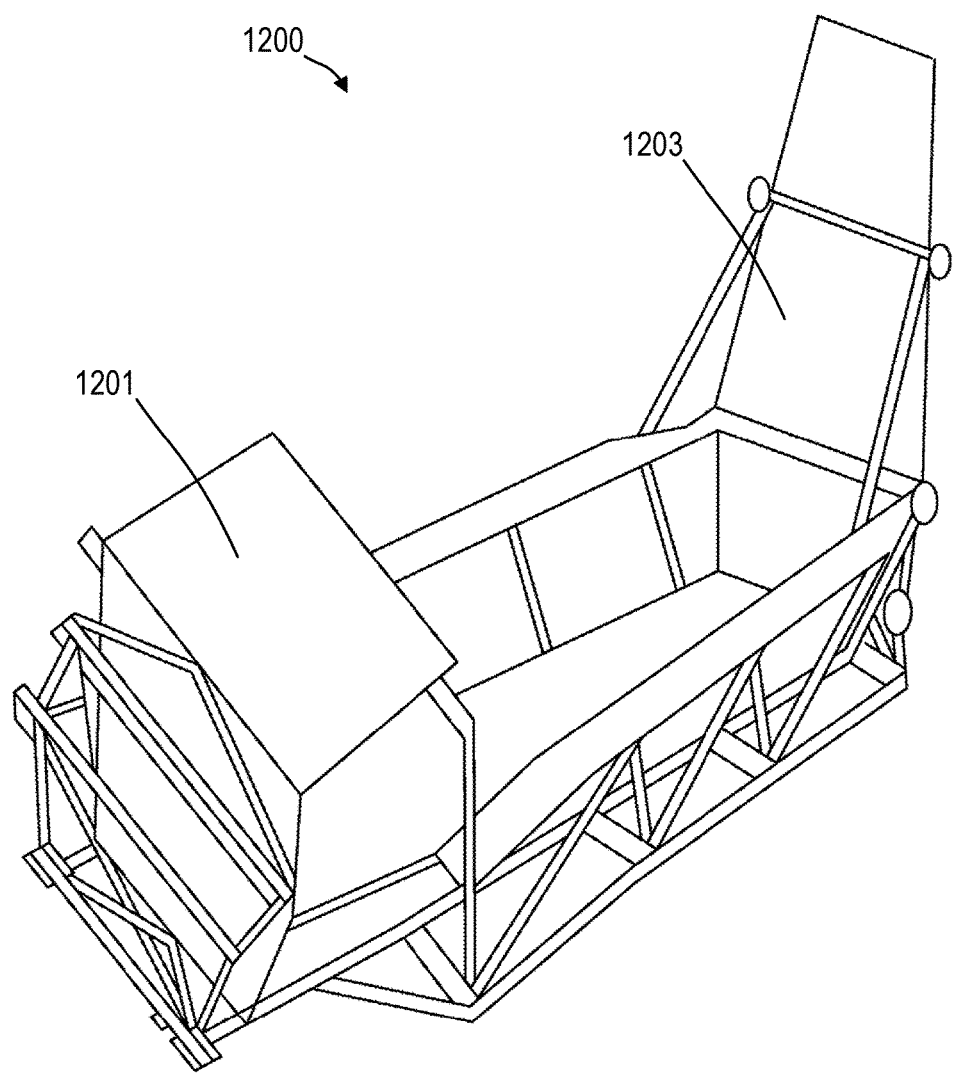
FIG. 12 shows a rendering of an exemplary output from one cycle of a simulation test.

FIG. 12 shows a rendering 1200 of an exemplary output from one cycle of simulation test software. This is a structural analysis of linear node locations and tube topography. The structure shown is a node-based vehicle frame with a sensitivity analysis of node locations and topography. Some portions of the structure may be more sensitive to node location and topography with relation to the current optimization objective. In this example, the left side 1201 of the structure (as viewed in FIG. 12) is more sensitive to node location than the right side 1203 of the structure. This simulation test result may drive one or more alterations to the left side of the structure.

Referring back to FIG. 11, as a test phase proceeds, measurements from the various tests may be compiled and recorded as Performance Test Results 1105 in the form of a vector of numerical readings. The vector may include for example measures of fuel consumption, gradeability, and temperature under stress, etc. The vector may also incorporate time sequences complied over standardized journeys or drive-cycles.

After the simulated test is complete, the compiled Performance Test Results 1105 may be evaluated by an optimality evaluation unit 1115. The optimality evaluation unit 915 may use a preselected goal state expressed as Goals &

Constraints 1113 to measure the acceptability of the model's performance. The distance from the model's current performance level to the goal performance level can be measured quantitatively. The direction of this vector in performance space may be used to guide further optimization by changing the setting of the increment step size, step direction, weight factor, etc., for a subsequent optimization iteration.

Figure 13:
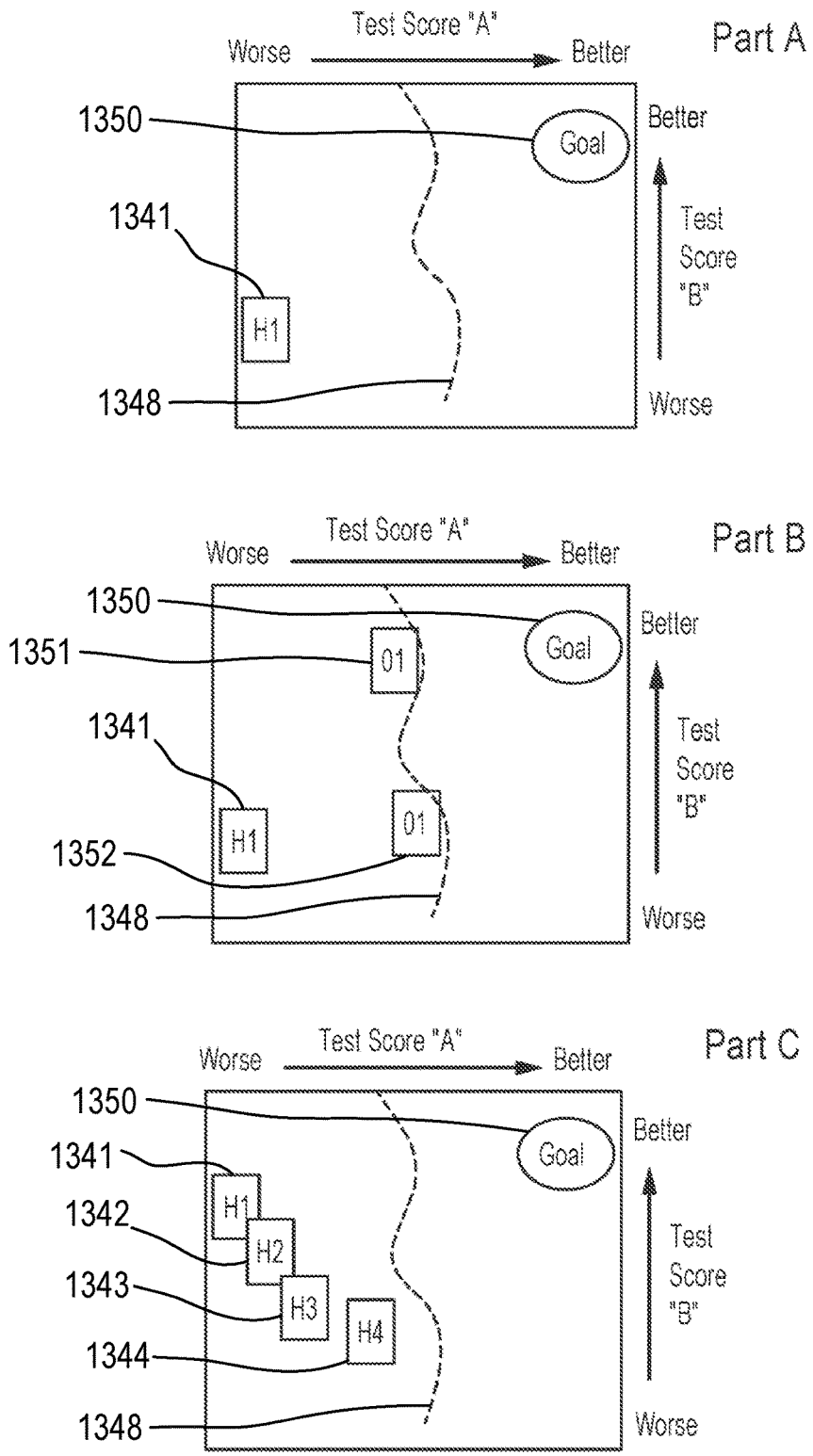
FIG. 13 shows a graph of exemplary Performance Test Result evaluated by an optimality evaluation unit.

FIG. 13 shows a graph of exemplary Performance Test Result 1105 evaluated by the optimality evaluation unit 1115. In this example, the graph is demonstrating two of the dimensions of the Performance Test Result vector 1105, which form the two axes "Test Score A" and "Test Score B". The two test scores can represent any two factors such as fuel economy and gradeability.

The two axes are oriented with the least desirable quadrant at bottom left and the most desirable quadrant at upper right. In part A of FIG. 13, Point 1350 may represent the estimated coordinate of the Goal state. There may exist some excess space between the corner and the goal, representing over-engineered or excessively capable product conditions.

The test results from a single simulation test's Performance Test Result vector are represented as point 1341. Constraint Line 1348 may represent a limit-horizon, imposed by other dimensions of the test result vector that are not representable on this graph. Areas to the right of Constraint Line 1348 may violate the product's functional needs, therefore there is no acceptable solution in this area. The graph in Part A indicates that Goal 1350 lies outside the constrained space. This indicates Goal point 1350 is unachievable by any simple trade between Test Score A and Test Score B. This case may correspond to a typical product performance space where a goal direction is clearly stated but for which no solution is directly visible or achievable.

In this case, point 1351 and point 1352 are displayed as optima candidates as shown in part B. Points 1351 and 1352 both satisfy constraint horizon line 1348, and both are proximal to Goal point 1350. Subsequent steps illustrate how the software explores this space to find an optimal satisfactory solution.

Test Results point 1341 is produced by a running a simulation test on the current vehicle model. In some cases, when a Performance Test Result vector indicates that the model falls significantly short of its stated performance goal, the result of the test may be classified as suboptimal. In this case, the model requires a modification of the model to improve its performance and the optimality evaluation unit 1115 may provide instructions containing the goal and requirement to the design alteration unit 1107.

In another case, when a test indicates that the model has achieved or exceeded the performance goal, the test result may be satisfactory in this score dimension. In this case, further optimization in the current alteration direction may not yield significant value. The iteration process is then either redirected or terminated by the optimality evaluation unit 1115.

In yet another case, when a test indicates that one or more constraint surfaces has been exceeded, a design violation may have occurred. In this case, the optimality evaluation unit 1115 may instruct the optimization process "steps back" to the prior higher-scoring design iteration. This removes the effects of the most recent design change. The discovery of a deteriorating direction is an indication that further incremental exploration in this parametric direction will not be productive. Similarly, when a constraint surface is found to be blocking incremental improvement, this is an indication that a local optimum has been reached.

Referring to FIG. 11, in the case that the optimality evaluation unit 1115 finds the current model has achieved the performance goal, the design process may end and the current model may be output as the optimal vehicle model 1117. In the case that an alteration requirement is indicated by the optimality evaluation unit 1115, the design alteration unit 1107 may make an incremental alteration to the initial vehicle model 1101, and produce an altered vehicle model 1109.

In some embodiments, the alteration may be made to one or more design parameters in the original model 1101. The parameters may be selected from a focus subset of all vehicle parameters. In some instances, the parameters may be manually selected in the case of a guided optimization. In other embodiments, the parameters may be automatically selected in the case of an open or vehicle-wide general optimization. In some embodiments, the parameters can be altered at various design refinement levels as previously described.

After a model 1109 has been altered, it may replace Initial Vehicle model 1101 as a new updated vehicle reference design.

In some embodiments, the simulation test unit 1103, optimality evaluation unit 1115 and the design alteration unit 1107 may be implemented in one or more custom software programs. The one or more software programs may be configured to interfacing to one or more simulation and analysis software programs. In some embodiments, one or more databases may be included to store data (e.g., initial vehicle model 1101, test plans & conditions 1111, goals and constraints 1113, performance test results 1105, altered vehicle model 1109, optimal vehicle model 1117, etc.) that are involved in the design process as described elsewhere.

In some embodiments, a direction of optimization can be tracked by visualizing the iteration results. By comparing the optimization path with the goal, further optimization direction may be decided. The graph in Part C of FIG. 13 shows Performance Test Result scores from four successive iterations 1341, 1342, 1343, and 1344. Each result is produced by a set of Simulation Tests run on an interactively altered model. In some embodiments, the alteration may be applied to the design variables. A pattern of optimization path can be evident in successive changes to each performance test score 1341, 1342, 1343, and 1344.

In another aspect, the present disclosure provides a method and system for design a 3-D printed structure based objects where the design process dynamically incorporates user preferences and physical data to enable an efficient personalized design.

In some embodiments, requirements of the design may be incorporated to the layered design process at different layers, and accordingly numerous alterations of the design model, test results, analysis may be generated. In some embodiments, the variety of data involved during a design process may be stored in one or more databases.

Figure 14:
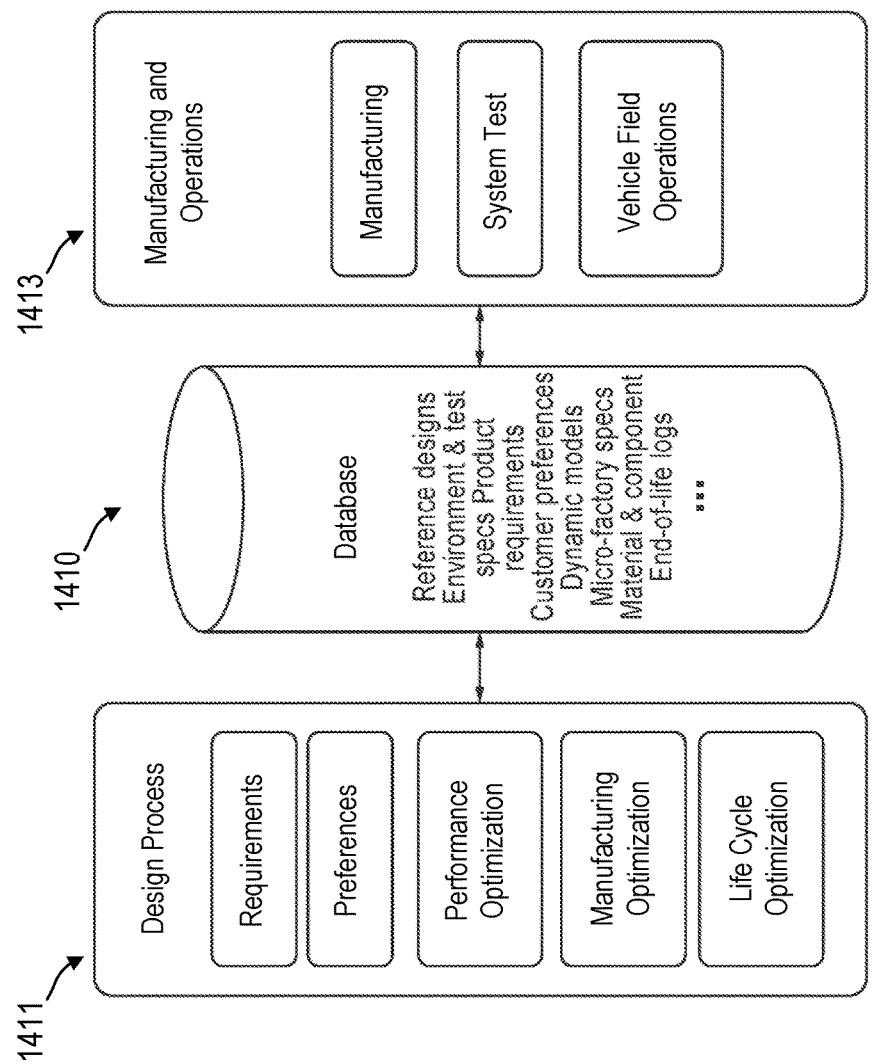
FIG. 14 illustrates an example of data contained in a database.

FIG. 14 illustrates an example of the data may be contained in a database in accordance with some embodiments. It should be noted that vehicle design is used herein for illustrative purpose, any other design product related data may be stored in the database based on the specific design.

The database(s) may be one or more memory devices configured to store data (e.g., sentence structures, sentence elements, words and images for each sentence element, etc.). Additionally, the database(s) may also, in some embodiments, be implemented as a computer system with a storage device. In one aspect, the database(s) may be used by components of the optimization system to perform one or more operations consistent with the disclosed embodiments. One of ordinary skill will recognize that the disclosed embodiments are not limited to the configuration and/or arrangement of the database(s).

In some embodiments, database 1410 may contain data related to models of a design and the actual product. A database (e.g., a library, vehicle design repository) may be created and used during the design stage. The database may be stored on one or more non-volatile memories of a computing device. The database may be stored on a local computing device of a user/designer. The database may also be stored on a cloud infrastructure which can be accessible by multiple users at various locations. The nodes and connectors, chassis sub-assemblies, chassis sub-structures, chassis modules, and/or chassis that have been designed and manufactured for an individual vehicle may be recorded in the database. Various characteristics and corresponding identifiers of each part may be recorded in the database. Such database may be used as a template when a user starts to design and manufacture another vehicle. Such database may also be used as references for maintaining and/or upgrading a previously fabricated vehicle.

In some embodiments, database 1410 may contain data related to models of a design. In some embodiments, the models may be physical model such that the relevant data may include feedback from experiment, system test, vehicle field test with the physical models. In this case, any suitable means such as sensory immersion, monitors and human experience may be used to obtain the feedback data. In other embodiments, the models may be mathematical model such that the data may be related to numerical simulations, tests, analysis, parametric model, or design description of one or more vehicles etc.

For example, database 1410 may include a library of reference vehicle designs, environmental and test specifications, product requirements, customer preferences, dynamic models, micro-factory and manufacturing specs, material and component specifications, vehicle field operation logs, and end-of-life logs.

During the layered vehicle design and optimization processes, database 1410 may be coupled to a five-layered design processes 1411. For example, the database may interactively read data associated with the design process such as pre-defined requirements, user input preferences, test plans, performance optimization data, manufacturing optimization data and life cycle optimization data, etc. In some embodiments, requirements and goals regarding vehicle's fundamental operating may be changed and refined that can be tracked by the database. As previously described, the requirements may be inherited from a reference vehicle and modified from properties lists, or tailored from scratch. The requirements may include for example operating rules set by governing or licensing bodies, federal safety standards, fuel and emission standards, roadway condition descriptions, environment descriptions, etc. These requirements may vary according to where the vehicle will be operated: which country jurisdiction and according to the purpose of the vehicle (for example, a utility truck, passenger commute car, emergency response vehicle, or a race car).

Some requirements may be defined once at the start of a vehicle design, and the definitions remain constant over the life of a vehicle. These requirements may affect the basic vehicle definition profile or the fundamental definition of the vehicle Other requirements may be defined in the middle of the design process such as user preference. These may include the vehicle type and general size, and establish some basic tradeoffs among factors addressing customer demands such as economy, performance features, size, and styling, and other derived attributes as described elsewhere.

In the meantime, the database may also record data generated during the design process such as the measurement of various aspects of the vehicle-model performance and model parameters at all or some steps of the design process.

In some embodiments, database 1410 also contains data related to an actual product 1413. These external sources 1413 may provide real-world feedback about physical outcomes. Data from these sources 1413 can include unexpected variances or tolerances (e.g., GD&T) during manufacturing, previously-unknown physical phenomena, and unintended consequences of optimization. For example, data stored in the database may include feedback which is generated after a delivery of a component or product, so it captures the final outcomes from the process. Outcomes may be either satisfactory or unsatisfactory. For example, the database may include data collected from a full life-cycle of the products. The collection of data may include product manufacture (starting at mining/pre raw materials), their design process, their manufacturing, delivery, field use, and eventual recycling. In another example, historic data gathered from similar products' performance under various real conditionals may be recorded and analyzed. In some embodiments, for a vehicle design database, the data may further contain information related to customers such as preferences, habits, environmental and road conditions, driving behaviors, etc.

In a 3-D printed node base manufacturing system, data may be captured and incorporated into the database 1410, allowing the information to be considered during the design of subsequent products, or during the revision of existing products. In some embodiments, the data feedback can be generated and displayed in real-time.

Figure 15:
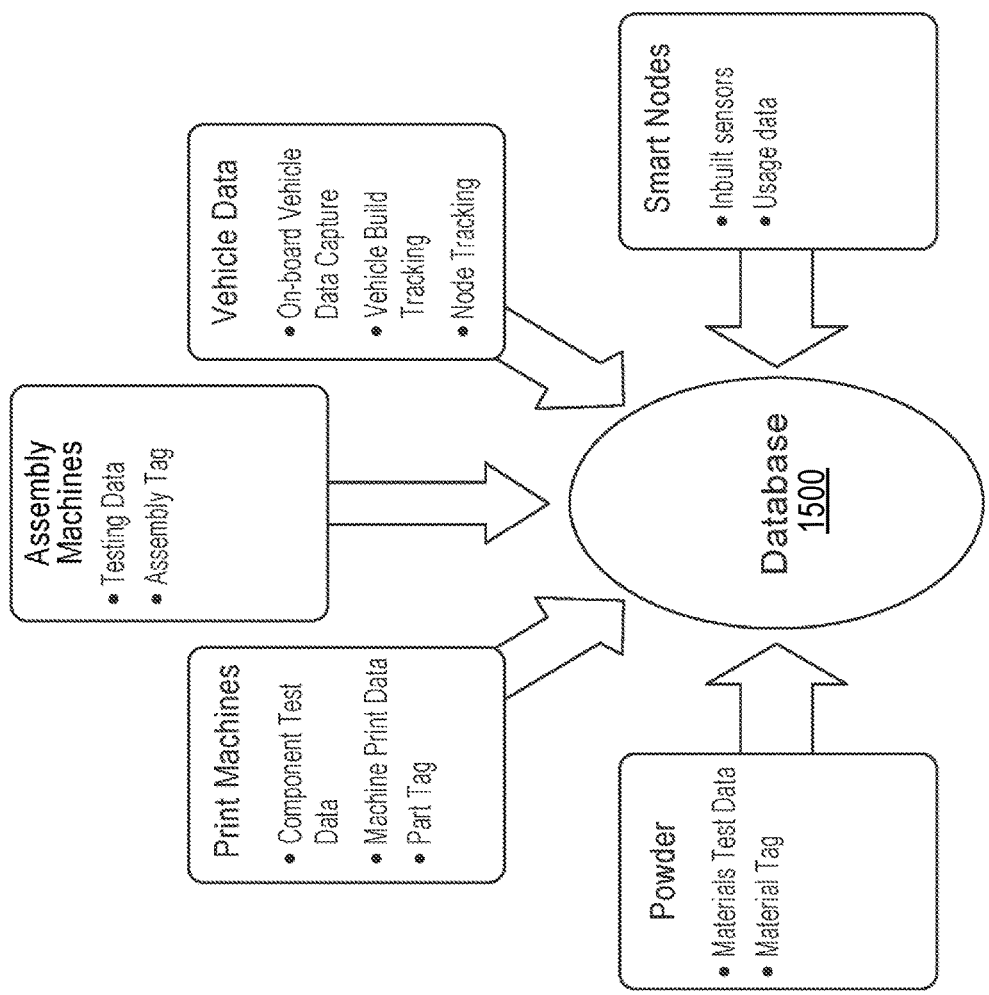
FIG. 15 illustrates examples of data from manufacturing and other processes.

FIG. 15 illustrates examples of data may be obtained from manufacturing and other processes, in accordance with embodiments. As shown in FIG. 15, data may be obtained from various areas such as materials used (e.g., powder, material tag, process parameters, etc), print machines (e.g., component test data, machine print data, part tag, etc), assembly machines (e.g., testing data, assembly tag, etc), vehicle data (vehicle build tracking, node tracking, etc), smart node (e.g., built-in sensor, usage data, etc). In some embodiments, data from the physical product can be fed back to the design process in a short-term such that the design may be improved before it is delivered to the customer. Data can be stored in a database 1500.

For example, data may be captured by sensors integrated into the nodes or joints (smart nodes) for detecting forces, utilization activity and states, pressures, temperatures, and/or any other parameters. In some embodiments, the sensors may be integrated into the joint via a 3-D printing process. The sensor may be detect major failure of the joint or a tube. An integrated sensor may determine whether a joint or other components of the vehicle are fit for service after a crash. Data captured from the sensors may provide a real-world performance results of the design in a timely fashion such that further improvement to the design is made possible.

In some embodiments, the present disclosure may allow individuals to design their desired structures. In this case, the database may include user specific data. The database may include order history of individuals, shipping preferences (e.g., assembled structures, semi-assembled, or entire custom vehicles), individual's driving habits, reports regarding driving experience, safety, etc.

The present disclosure may also allow for adjustment to parts or part quality related to performance in the field. For example, the database could contain triggers for redesign based on warranty claims, or customer complaint areas. Systems may be updated based on any number of performance criteria, and designs would be adjusted to address performance, durability, alignment, wear, or other issues.

Figure 16:
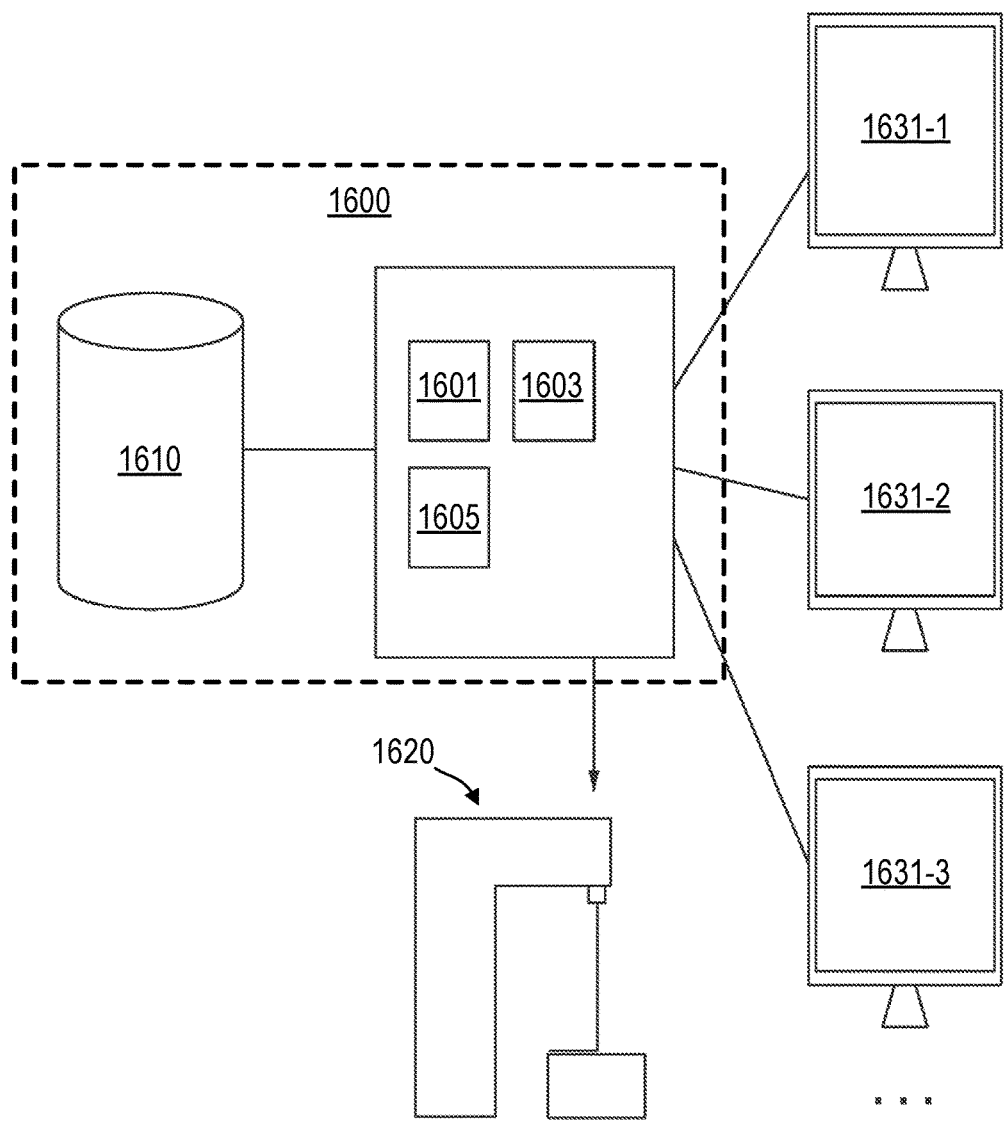
FIG. 16 illustrates a schematic block diagram of an exemplary design optimization system.

FIG. 16 illustrates a schematic block diagram of an exemplary design optimization system 1600, in accordance with embodiments of the disclosure. The design optimization system may be configured to perform design and optimization operations as described elsewhere herein. The design optimization system 1600 may include a device including one or more processors 1601, a memory 1603, a graphical user interface 1605, and user interactive device. The memory may include non-transitory computer readable media including code, logic, or instructions for performing one or more steps, such as the design steps or computations. The memory may include one or more databases as described in FIG. 14. The processor may be configured to perform the steps in accordance with the non-transitory computer readable media. The graphical user interface and user interactive device may allow a user input preferences and requirements to the design as described in FIG. 10D. The device may be a desktop computer, cell, smartphone, tablet, laptop, server, or any other type of computational device. It shall be understood that the term design optimization herein may refer to customization or personalization of design and may be interchangeably used throughout this description.

In certain embodiments, the device may be a cloud based processing cluster implemented on a server configured to operate as a front-end device, where the front-end device is configured to provide a graphical user interface to a user. A server may include known computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs, special purpose computers, or general purpose computers.

As mentioned previously, the server may be a server in a data network such as cloud computing network. The server can be computer programmed to transmit data, accept requests, distribute work with other computing devices and/or user interface. In addition, the server may include a web server, an enterprise server, or any other type of computer server.

Design optimization system 1600 may be in communication with a 3-D printer 1620. For example, 3-D printer 1620 can be a PBF system such as PBF system 100 of FIGS. 1A-D above. Design optimization system 1600 may or may not be co-located with the 3-D printer. The 3-D printer 1620 may print the structures according to the design developed in the software program. The 3-D printer can be configured to generate an object through additive and/or subtractive manufacturing. The 3-D printer can be configured to form a metallic, composite, or polymer object. The 3-D printer may be a direct metal laser sintering (DMLS) printer, electron beam melting (EBM) printer, fused deposition modeling (FDM) printer, or a Polyjet printer. The 3-D printer may print joints made of titanium, aluminum, stainless steel, structural plastics, or any other structural material. As mentioned previously, design optimization system 1600 may further include a database 1610. The database may be accessible to the device and can be the same database as described in FIG. 14.

The design optimization system 1600 may communicate with one or more external devices 1631-1, 1631-2, and 1631-3. The one or more external devices may be a computing device configured to perform simulation test, analysis, optimizations as described elsewhere herein. The various operations may or may not be operated concurrently on the external devices. The external devices may receive instructions, parameters, design model, etc., from the design optimization system 1600 and output analysis results or any results according to the instructions to the design optimization system. Communications may occur over a network. The network may be a communication network. The communication network(s) may include local area networks (LAN) or wide area networks (WAN), such as the Internet. The communication network(s) may include telecommunication network(s) including transmitters, receivers, and various communication channels (e.g., routers) for routing messages in-between. The communication network(s) may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocols.

Figure 17A:
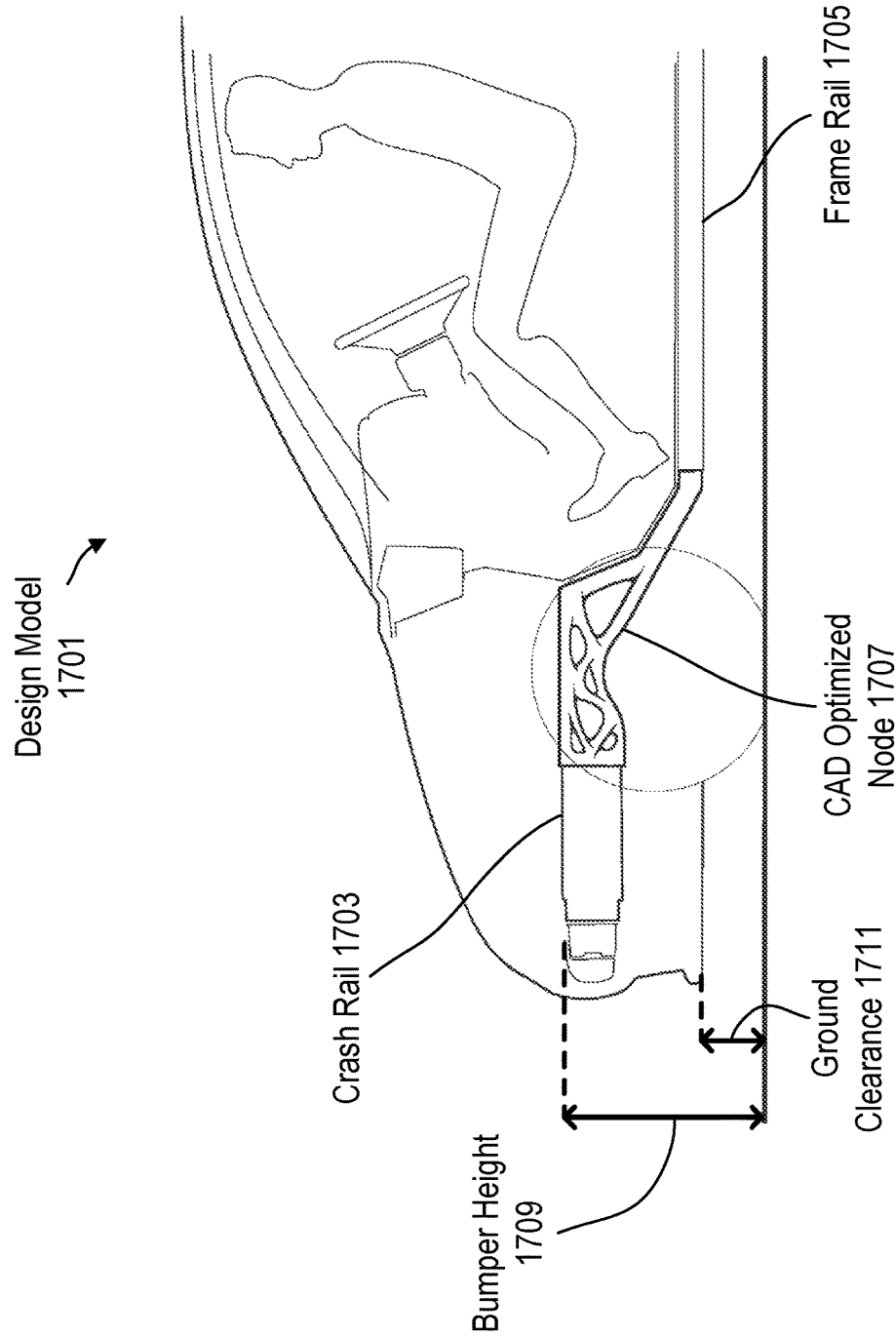
FIGS. 17A-B illustrate an exemplary modification to elements of a vehicle front end structure in order to satisfy a ground clearance criterion.
Figure 17B:
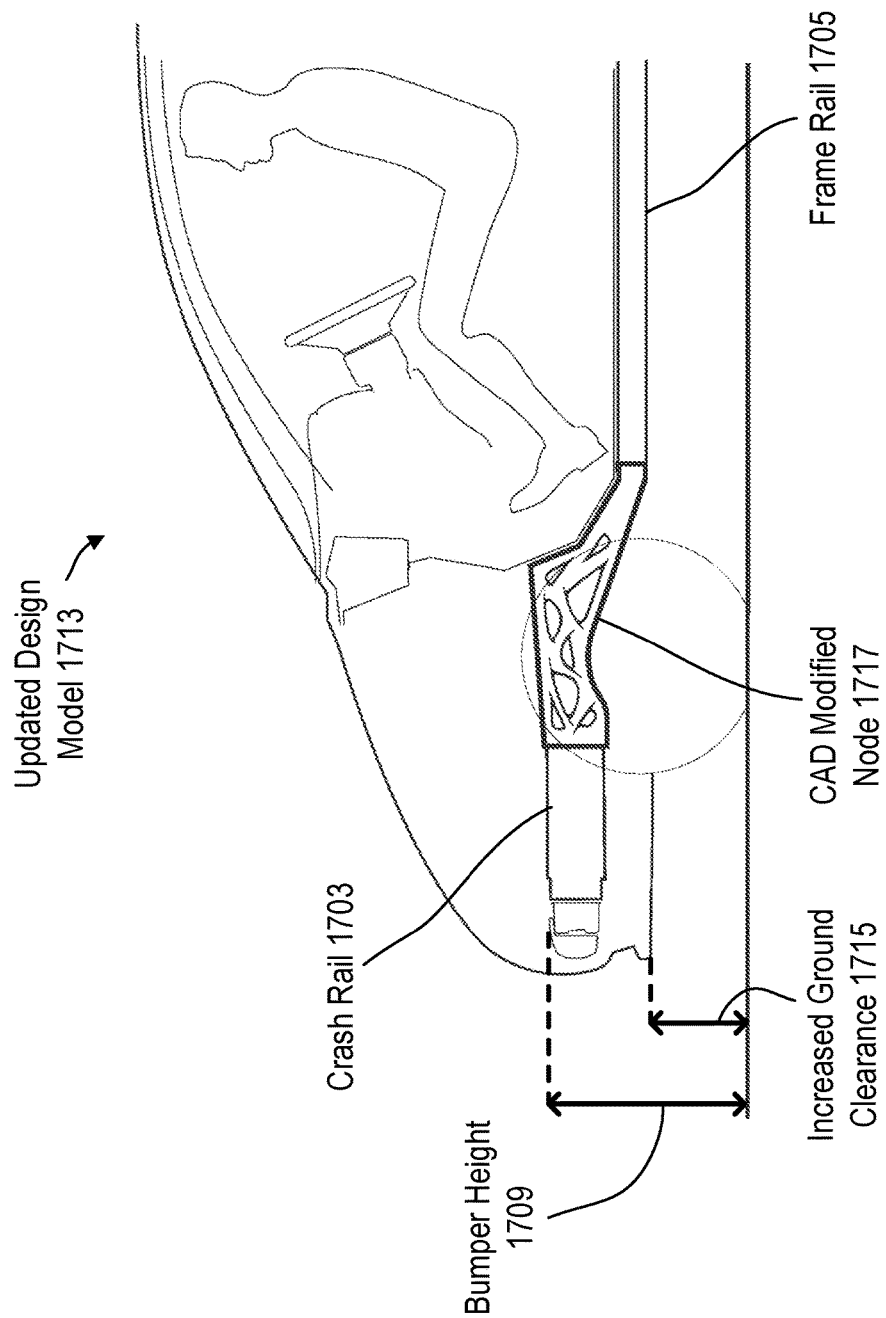

FIGS. 17A-B illustrate an exemplary modification to elements of a vehicle front end structure in order to satisfy a ground clearance criterion. The modification may be determined by an integrator, such as integrator 219 of FIG. 2, for example. FIG. 17A illustrates a design model 1701 of a vehicle body□front end structure. Design model 1701 may be an initial design model, for example, or may be a design model that has been determined after multiple iterations of a multi-factor integrated design process such as described above. A crash rail 1703 and underbody frame rail 1705 are joined by a CAD optimized node 1707 that □ is designed to transfer crash loads into the □ underbody structure. Design model 1701 has a bumper height 1709 that is based on a government regulated requirement. Design model 1701 also has a ground clearance 1711. In this example, ground clearance 1711 does not satisfy a minimum ground clearance criteria. An integrator, such as integrator 219, can modify design model by, for example, raising the ground clearance. The information of the raised ground clearance can be sent to a CAD analysis component to analyze the updated design model and provide the analysis to the integrator. In this example, the analysis provided by the CAD analysis component can include a modified node structure, as shown in FIG. 17B.

FIG. 17B illustrates an updated design model 1713 based on the analysis provided by the CAD analysis component. In particular, the vehicle's ground clearance has be increased, as shown by increased ground clearance 1715. This has reduced the height differential between crash rail 1703 and frame rail 1705.☐The node design has been analyzed and automatically recalculated ☐ to a CAD modified node 1717. In this way, for example, the analysis provided by the CAD analysis component (i.e., the CAD modified node) can be integrated into updated design model 1713 by the integrator. Although not shown in the figures, the integrator also can receive updated analyses from multiple other analysis components, such as an updated cost, updated weight, updated crash simulation results, updated aerodynamic characteristics, etc. All of the updated analyses from the various multiple analysis components can be integrated by the integrator to determine updated design model 1713. If all of the vehicle criteria are satisfied, the iteration can end, and 3-D printing instructions can be generated for printing one or more parts, such as CAD modified node 1717. Some parts may be COTS parts, for example, which can be ordered through a supply system.

Even in the case that all vehicle criteria are satisfied by updated design model 1713, the system may continue to iteratively optimize the design. In various embodiments, some criteria can be weighted as more desirable to improve. For example, once all the vehicle criteria are satisfied, the system may attempt to improve the coefficient of drag before attempting to improve total vehicle cost.

Figure 18:
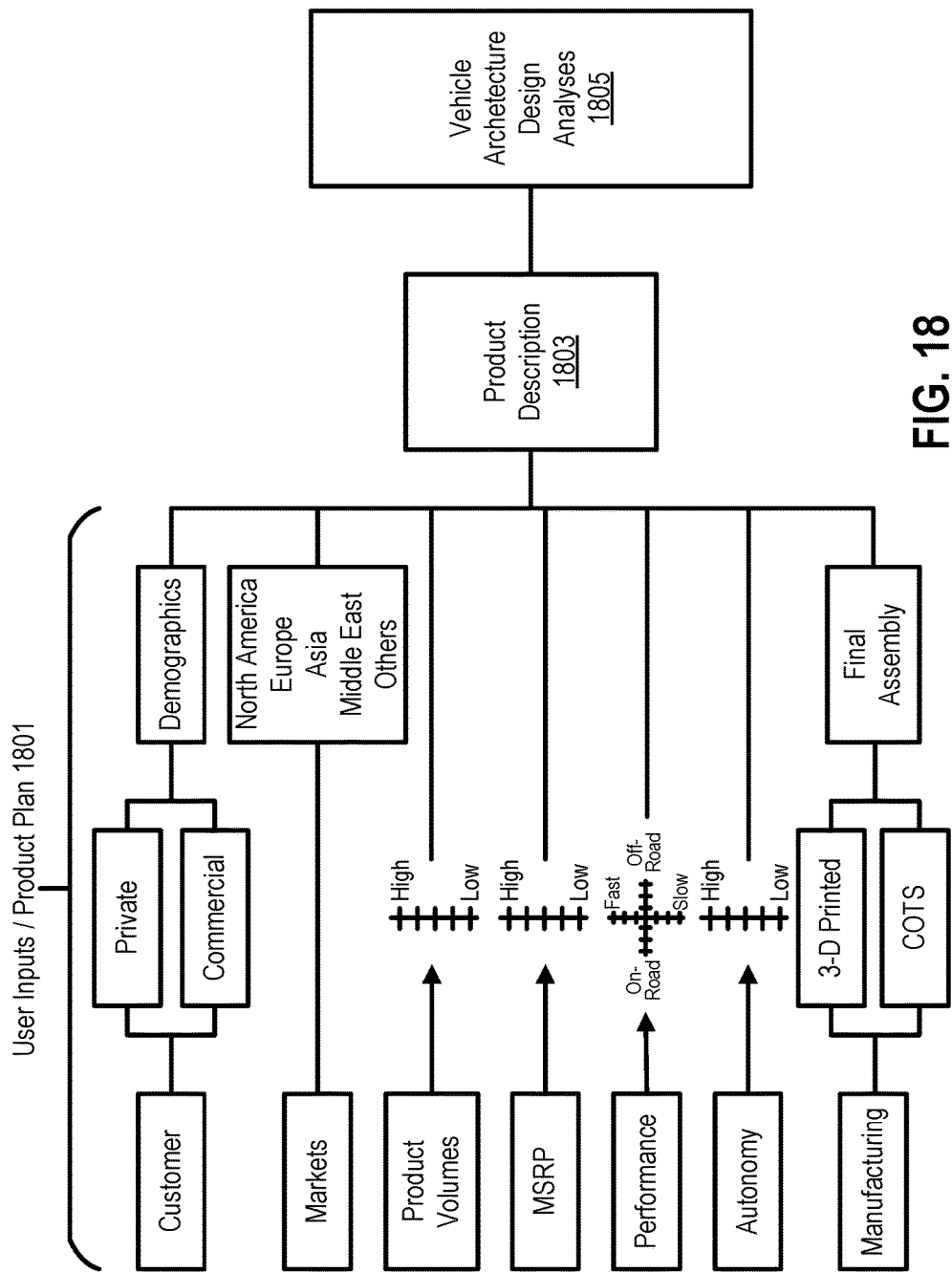
FIG. 18 illustrates an exemplary multi-factor integrated design process.

FIG. 18 illustrates an exemplary multi-factor integrated design process. FIG. 18 shows some exemplary user inputs that can form the basis of a product plan 1801. Various elements of product plan 1801 may be user-selectable, for example, by sliders, selectors, etc., which may be presented to a user in a graphical user interface on a computer display. For example, a target customer may be selected as private or commercial. Demographics information may also be input. One or more markets may be selected, such as North America, Europe, etc. A product volume can be selected, for example, with a slider that ranges from a low volume to a high volume. A target manufacturers retail price (MSRP) can be entered, either as a single value or a range of values. Performance characteristics can be selected, such as a top speed (e.g., from slow to fast), an on/off road characteristic, etc. A level of autonomy can be selected. Manufacturing characteristics can be selected, e.g., an amount of 3-D printing that can be utilized for printing parts of the vehicle versus an amount of COTS part that may be used.

The system can generate a product description 1803 based on product plan 1801 inputs. For example, product description 1803 may include elements such as brand identity, product image, primary functionality, number of occupants, legal requirements, cost, emissions, top speed, acceleration, handling, off road capability, cargo capability, NVH, ☐GVW, production volumes, manufacturing process, etc.

Product description 1803 can form the basis of vehicle architecture design analyses 1805. That is, specific vehicle criteria can be determined based on product description 1803. The criteria can include, for example, input criteria, such as: Ground clearance; center of gravity requirement; Aerodynamics Requirement; Underbody Structure Depth; Step Over Height/Width; Ease of Ingress Egress; Eye Point Height from Ground; Forward Vision; Head Room requirements; Overall Height Limits; Design—Proportions; and Autonomy Levels (driver orientation). Hard point output and deliverable criteria can include: Heel Point X & Z Location; Ball of Foot X & Z Location; H-Point X & Z Location (SgRP); Backangle; Effective Headroom Point; Forward Up Angle; Forward Down Angle; Eye Ellipse Location; Head Contour Location; Shin CL Location; Thigh CL Location; and V1 & V2 eye points. Affected/facilitated systems location criteria can include: Driver's Seat; Steering Wheel; Pedals; Shifter; Dash; Floor; Front Door Aperture (A-B Flange); Instrument Cluster Obscuration; Cowl Height; Header Location; Roof Height; A Pillar Obscuration; Reach Zones (All controls and switches); Mirrors; Rear Plane of Crash Space for FMVSS 208; Seat Track Travel Envelope; Rear Occupant Set Up; Overall Height; and Knee Blocker. Other input criteria can include: Cargo Dimensions/volume; Cargo weight; Desired Lift Over Height; and Protection Requirements (from: the elements, theft, impact). Other hard point output/deliverables criteria can include: Trunk/Bed Dimensions; Vehicle interior height & width dimensions; Load Floor height; Lift Over Height; Loading Apertures (A-B Flange). Other affected/facilitated system location criteria can include: Seats; Body Structure (floor, underbody frame, closures); Axle Locations; Tire Profiles; Overall Dimensions; Crash Loads; Durability Testing; and Suspension Choice.

Thus, there can be numerous specific criteria that can be determined based on user inputs in the form of product plan 1801.

Figure 19:
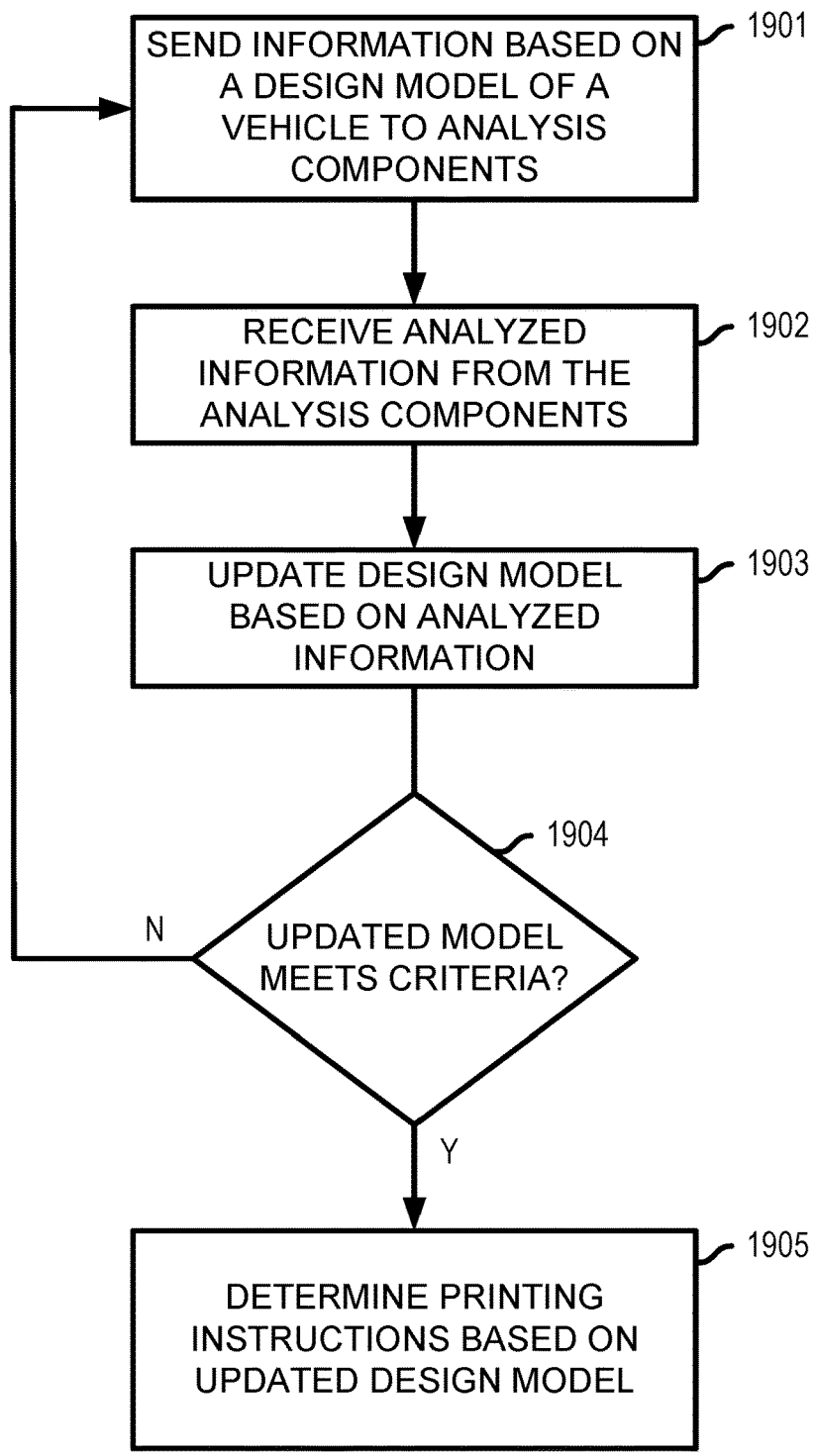
FIG. 19 is a flowchart illustrating an exemplary integrated design process.

FIG. 19 is a flowchart illustrating an exemplary integrated design process. The process can be performed, for example, by a processor executing computer-executable program instructions. In various embodiments, an integrator, such as integrator 219 can perform the process illustrated in FIG. 19. An integrator can send (1901) information based on a design model of a vehicle to multiple analysis components. For example, the integrator can use an initial design model, can determine particular information about the design model that is relevant for a first analysis component, such as an aerodynamic component, and can send that information to the first analysis component. Likewise, the integrator can determine and send relevant information to other analysis components. The information sent to each analysis component allows the analysis component to perform an analysis of the design model based on the analysis factor of the analysis component.

The integrator can receive (1902) analyzed information from each analysis component. The integrator can update (1903) the design model based on the analyzed information. The integrator can determine (1904) whether the updated design model satisfies criteria of the vehicle, such as various criteria discussed above. The integrator can determine (1905) printing instructions for a 3-D printer to additively manufacture one or more structures of the vehicle based on the updated design model and printing the one or more structures based on the printing instructions if the updated design model satisfies the criteria. On the other hand, if the updated design model does not satisfy the criteria, the integrator can send information based on the updated design model to the analysis components, so that the analysis components can analyze the information based on the updated design model.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An additive manufacturing apparatus, comprising:
    (i) a printer that additively manufactures structures for a vehicle;
    (ii) a plurality of analysis components, each analysis component being configured to receive information based on a design model of the vehicle and to analyze the information based on an analysis factor, wherein each analysis component analyzes the information based on a different analysis factor than the other analysis components; and
    (iii) an integrator that receives the analyzed information from the analysis components, updates the design model based on the analyzed information, and determines whether the updated design model satisfies criteria,
    (iv) wherein, if the updated design model satisfies the criteria, the integrator determines printing instructions for the printer to print the one or more structures of the vehicle based on the updated design model and wherein the printer receives the printing instructions from the integrator and prints the one or more structures using the received printing instructions;
    (v) and if the updated design model does not satisfy the criteria,
        (a) the integrator sends information based on the updated design model to the analysis components,
        (b) the analysis components analyze the information based on the updated design model,
        (c) the integrator receives the analyzed information, updates the design model based on the analyzed information, and determines whether the updated design model satisfies criteria,
        (d) wherein steps (a)-(c) are performed one or more times until the updated design model satisfies the criteria,
        (e) when the updated design model satisfies the criteria, the integrator determines other printing instructions and sends the other printing instructions to the printer and the printer prints the one or more structures using the other printing instructions.

2. The apparatus of claim 1, wherein one or more of the analysis components includes a computer aided engineering (CAE) component.

3. The apparatus of claim 1, wherein the analysis components include a first analysis component and a second analysis component,
    the first analysis component including at least an aerodynamic component, a thermal component, a stiffness component, a noise, vibration, and harshness (NVH) component, an environmental impact component, an additive manufacturing component, a crashworthiness component, a vehicle dynamics component, a composite materials component, a node location component, a commercial off-the-shelf (COTS) parts component, a durability component, or a cost component, and
    the second analysis component including at least a different one of the aerodynamic component, the thermal component, the stiffness component, the NVH component, the environmental impact component, the additive manufacturing component, the crashworthiness component, the vehicle dynamics component, the composite materials component, the node location component, the COTS parts component, the durability component, or the cost component.

4. The apparatus of claim 1, wherein the printer includes a powder-bed fusion system.

5. The apparatus of claim 1, wherein the analysis components are arranged in hierarchical levels of topology of the design model.

6. The apparatus of claim 5, wherein a first one of the hierarchical levels includes analyzing a material composition of a node structure, a second one of the hierarchical levels includes analyzing a shape the node structure, and a third one of the hierarchical levels includes analyzing a placement of the node structure relative to one or more other node structures.

7. The apparatus of claim 1, wherein analyzing the information by the analysis components is performed in parallel.

8. The apparatus of claim 1, further comprising:
    a user input component that receives input from a user, wherein the criteria are based on the user input.

9. The apparatus of claim 8, wherein the input includes a performance characteristic of the vehicle.

10. The apparatus of claim 8, wherein the input includes a vehicle type of the vehicle.

11. The apparatus of claim 1, wherein the criteria are based on a government regulated standard of the vehicle.

12. The apparatus of claim 1, further comprising:
    a database of COTS parts, wherein the updated design model includes one or more COTS parts from the database, such that the printing instructions exclude instructions for printing the one or more COTS parts.

13. A method of additive manufacturing, comprising:
    (i) sending information based on a design model of a vehicle to a plurality of analysis components;
    (ii) receiving analyzed information from the analysis components, wherein each analysis component analyzes the information based on a different analysis factor than the other analysis components;
    (iii) updating the design model based on the analyzed information;
    (iv) determining whether the updated design model satisfies criteria;
    (v) if the updated design model does not satisfy the criteria, sending information based on the updated design model to the analysis components and repeating (ii)-(iv) one or more times until the updated design model satisfies the criteria; and
    (vi) determining printing instructions for a printer to additively manufacture one or more structures of the vehicle based on the updated design model and printing the one or more structures based on the printing instructions when the updated design model satisfies the criteria.

14. The method of claim 13, wherein analyzing the information includes analyzing the information based on a computer aided engineering (CAE) model.

15. The method of claim 13, wherein the analysis components include a first analysis component and a second analysis component,
    the first analysis component including at least an aerodynamic component, a thermal component, a stiffness component, a noise, vibration, and harshness (NVH) component, an environmental impact component, an additive manufacturing component, a crashworthiness component, a vehicle dynamics component, a composite materials component, a node location component, a commercial off-the-shelf (COTS) parts component, a durability component, or a cost component, and the second analysis component including at least a different one of the aerodynamic component, the thermal component, the stiffness component, the NVH component, the environmental impact component, the additive manufacturing component, the crashworthiness component, the vehicle dynamics component, the composite materials component, the node location component, the COTS parts component, the durability component, or the cost component.

16. The method of claim 13, wherein the printing instructions include powder-bed fusion printing instructions.

17. The method of claim 13, wherein analyzing the information is based on hierarchical levels of topology of the design model.

18. The method of claim 17, wherein a first one of the hierarchical levels includes analyzing a material composition of a node structure, a second one of the hierarchical levels includes analyzing a shape the node structure, and a third one of the hierarchical levels includes analyzing a placement of the node structure relative to one or more other node structures.

19. The method of claim 13, wherein analyzing the information by the analysis components is performed in parallel.

20. The method of claim 13, further comprising:
receiving input from a user, wherein the criteria are based on the user input.

21. The method of claim 20, wherein the input includes a performance characteristic of the vehicle.

22. The method of claim 20, wherein the input includes a vehicle type of the vehicle.

23. The method of claim 13, wherein the criteria are based on a government regulated standard of the vehicle.

24. The method of claim 13, further comprising:
selecting one or more COTS parts from a database of COTS parts, wherein the updated design model includes the one or more COTS parts from the database, such that the printing instructions exclude instructions for printing the one or more COTS parts.

25. A non-transitory computer-readable medium storing computer-executable instructions for additive manufacturing, the instructions executable to perform:
(i) sending information based on a design model of a vehicle to a plurality of analysis components;
(ii) receiving analyzed information from the analysis components, wherein each analysis component analyzes the information based on a different analysis factor than the other analysis components;
(iii) updating the design model based on the analyzed information;
(iv) determining whether the updated design model satisfies criteria;
(v) if the updated design model does not satisfy the criteria, sending information based on the updated design model to the analysis components and repeating (ii)-(iv) one or more times until the updated design model satisfies the criteria; and
(vi) determining printing instructions for a printer to additively manufacture one or more structures of the vehicle based on the updated design model and printing the one or more structures based on the printing instructions when the updated design model satisfies the criteria.

26. The non-transitory computer-readable medium of claim 25, wherein analyzing the information includes analyzing the information based on a computer aided engineering (CAE) model.

27. The non-transitory computer-readable medium of claim 25, wherein the analysis components include a first analysis component and a second analysis component,
the first analysis component including at least an aerodynamic component, a thermal component, a stiffness component, a noise, vibration, and harshness (NVH) component, an environmental impact component, an additive manufacturing component, a crashworthiness component, a vehicle dynamics component, a composite materials component, a node location component, a commercial off-the-shelf (COTS) parts component, a durability component, or a cost component, and
the second analysis component including at least a different one of the aerodynamic component, the thermal component, the stiffness component, the NVH component, the environmental impact component, the additive manufacturing component, the crashworthiness component, the vehicle dynamics component, the composite materials component, the node location component, the COTS parts component, the durability component, or the cost component.

28. The non-transitory computer-readable medium of claim 25, wherein the printing instructions include powder-bed fusion printing instructions.

29. The non-transitory computer-readable medium of claim 25, wherein analyzing the information is based on hierarchical levels of topology of the design model.

30. The non-transitory computer-readable medium of claim 29, wherein a first one of the hierarchical levels includes analyzing a material composition of a node structure, a second one of the hierarchical levels includes analyzing a shape the node structure, and a third one of the hierarchical levels includes analyzing a placement of the node structure relative to one or more other node structures.

31. The non-transitory computer-readable medium of claim 25, wherein analyzing the information by the analysis components is performed in parallel.

32. The non-transitory computer-readable medium of claim 25, the instructions executable further to perform:
receiving input from a user, wherein the criteria are based on the user input.

33. The non-transitory computer-readable medium of claim 32, wherein the input includes a performance characteristic of the vehicle.

34. The non-transitory computer-readable medium of claim 32, wherein the input includes a vehicle type of the vehicle.

35. The non-transitory computer-readable medium of claim 25, wherein the criteria are based on a government regulated standard of the vehicle.

36. The non-transitory computer-readable medium of claim 25, the instructions executable further to perform:
selecting one or more COTS parts from a database of COTS parts, wherein the updated design model includes the one or more COTS parts from the database, such that the printing instructions exclude instructions for printing the one or more COTS parts.

* * * * *